US011851598B2

(12) United States Patent
Abdulazeez et al.

(10) Patent No.: US 11,851,598 B2
(45) Date of Patent: *Dec. 26, 2023

(54) CORROSION INHIBITION METHOD FOR INORGANIC ACIDIC MEDIA

(71) Applicant: King Fahd University of Petroleum and Minerals, Dhahran (SA)

(72) Inventors: Ismail Abdulazeez, Dhahran (SA); Othman Al-Hamouz, Dhahran (SA); Abdulaziz Al-Saadi, Dhahran (SA); Mazen Khaled, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/826,348

(22) Filed: May 27, 2022

(65) Prior Publication Data

US 2022/0282157 A1   Sep. 8, 2022

Related U.S. Application Data

(63) Continuation of application No. 16/361,355, filed on Mar. 22, 2019, now Pat. No. 11,377,595.

(51) Int. Cl.
*C09K 15/20* (2006.01)
*C23F 11/14* (2006.01)

(52) U.S. Cl.
CPC ............ *C09K 15/20* (2013.01); *C23F 11/147* (2013.01)

(58) Field of Classification Search
CPC .................................. C09K 15/20; C23F 11/147
See application file for complete search history.

(56) References Cited

U.S. PATENT DOCUMENTS

| 9,732,235 B2 | 8/2017 | Iroh et al. |
| 11,377,595 B2 * | 7/2022 | Abdulazeez ............ C23F 11/04 |
| 2007/0158616 A1 | 7/2007 | Luo et al. |
| 2012/0289650 A1 | 11/2012 | Gertzmann et al. |

FOREIGN PATENT DOCUMENTS

| CN | 103820778 B | 8/2016 |
| GB | 1 597 038 | 11/1981 |
| KR | 10-1687987 | 12/2016 |

OTHER PUBLICATIONS

U.S. Appl. No. 17/826,287 (Year: 2022).*
Tatiya, et al.; Designing of polyamidoamine-based polyurea microcapsules containing tung oil for anticorrosive coating applications; J. Coat Technol. Res. 13 (4); 2016; pp. 715-726; 12 Pages.
Tatiya, et al.; Novel Polyurea Microcapsules Using Dendritic Functional Monomer: Synthesis. Characterization, and Its Use in Self-healing and Anticorrosive Polyurethane Coatings; Industrial & Engineering Chemistry Research 52; pp. 1562-1570; Dec. 18, 2012; 9 Pages.

* cited by examiner

*Primary Examiner* — Edward J Cain
(74) *Attorney, Agent, or Firm* — Oblon, McClelland, Maier & Neustadt, L.L.P.

(57) ABSTRACT

Methods for preventing, inhibiting, or reducing metal (e.g. mild steel) corrosion in aqueous media utilizing a water-soluble formulation having a polyurea pre-dissolved in a polar aprotic solvent are described. The polyurea contains reacted units of a diisocyanate and a diaminoalkane. The effectiveness of the methods is demonstrated by corrosion inhibition efficiency and corrosion rate of metallic substrates in aqueous acidic environments using the water-soluble formulation.

12 Claims, 16 Drawing Sheets

* Residual acetonitrile

CORROSION INHIBITION METHOD FOR INORGANIC ACIDIC MEDIA

CROSS-REFERENCE TO RELATED APPLICATIONS

The present application is a Continuation of U.S. application Ser. No. 16/361,355 now allowed, having a filing date of Mar. 22, 2019.

STATEMENT OF FUNDING ACKNOWLEDGEMENT

This project was supported by the Deanship of Scientific Research (DSR) at King Fahd University of Petroleum and Minerals (KFUPM), Saudi Arabia under project No. NUS15107/8.

BACKGROUND OF THE INVENTION

Technical Field

The present disclosure relates to methods of preventing or reducing metal corrosion in aqueous media using a water-soluble composition containing polyurea pre-dissolved in a polar aprotic solvent.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The use of acidic solutions for scaling control and removal is common practice in many industrial processes. However, these acidic solutions attack metallic structures leading to metallic corrosion [N. Ahmad, A. G. MacDiarmid, Inhibition of corrosion of steels with the exploitation of conducting polymers, Synthetic Metals, 78 (1996) 103-110; and S. K. Shukla, M. A. Quraishi, R. Prakash, A self-doped conducting polymer "polyanthranilic acid": An efficient corrosion inhibitor for mild steel in acidic solution, Corrosion Science, 50 (2008) 2867-2872]. Corrosion of metallic structures constitutes a significant portion of the total cost incurred in oil and gas producing companies. It often leads to incidents including pollution of water and other natural resources, shutdown of oil production facilities, and even loss of life [L. A. C. J. Garcia, C. J. B. M. Joia, E. M. Cardoso, O. R. Mattos, Electrochemical methods in corrosion on petroleum industry: laboratory and field results, Electrochimica Acta, 46 (2001) 3879-3886].

Organic molecules containing oxygen, sulfur or nitrogen heteroatoms, as well as those having a delocalized π-electron system, have been effectively used as organic corrosion inhibitors [A. Zeino, I. Abdulazeez, M. Khaled, M. W. Jawich, I. B. Obot, Mechanistic study of polyaspartic acid (PASP) as eco-friendly corrosion inhibitor on mild steel in 3% NaCl aerated solution, Journal of Molecular Liquids, 250 (2018) 50-62; and L. O. Olasunkanmi, I. B. Obot, M. M. Kabanda, E. E. Ebenso, Some Quinoxalin-6-yl Derivatives as Corrosion Inhibitors for Mild Steel in Hydrochloric Acid: Experimental and Theoretical Studies, The Journal of Physical Chemistry C, 119 (2015) 16004-16019]. These molecules demonstrate anticorrosion properties through displacement of water molecules on the metal surface and formation of a protective layer, thus isolating the metal from corrosive medium [A. Ongun Yüce, B. Doğru Mert, G. Kardaş, B. Yazıcı, Electrochemical and quantum chemical studies of 2-amino-4-methyl-thiazole as corrosion inhibitor for mild steel in HCl solution, Corrosion Science, 83 (2014) 310-316]. In the past few years, organic polymers have attracted great attention in corrosion inhibition research because of their high chemical stability, large surface coverage, cost effectiveness, and high corrosion inhibition efficiencies at relatively low concentrations compared to small organic molecules [B. Ramaganthan, M. Gopiraman, L. O. Olasunkanmi, M. M. Kabanda, S. Yesudass, I. Bahadur, A. S. Adekunle, I. B. Obot, E. E. Ebenso, Synthesized photo-cross-linking chalcones as novel corrosion inhibitors for mild steel in acidic medium: experimental, quantum chemical and Monte Carlo simulation studies, RSC Advances, 5 (2015) 76675-76688; R. Baskar, D. Kesavan, M. Gopiraman, K. Subramanian, Corrosion inhibition of mild steel in 1.0M hydrochloric acid medium by new photo-cross-linkable polymers, Progress in Organic Coatings, 77 (2014) 836-844; and Y. Ren, Y. Luo, K. Zhang, G. Zhu, X. Tan, Lignin terpolymer for corrosion inhibition of mild steel in 10% hydrochloric acid medium, Corrosion Science, 50 (2008) 3147-3153, each incorporated herein by reference in their entirety]. The presence of various functional groups in polymers enables them to form strong interactions with the metal ions. These interactions occupy a large percentage of surface area on the metal thus preventing further dissolution and corrosion [Y. Ren, Y. Luo, K. Zhang, G. Zhu, X. Tan, Lignin terpolymer for corrosion inhibition of mild steel in 10% hydrochloric acid medium, Corrosion Science, 50 (2008) 3147-3153, incorporated herein by reference in its entirety].

Because of its high thermal and chemical resistance, good abrasion resistance, structural enhancement, waterproofness, and structural diversity, polyurea is commonly used as a protective coating against metallic corrosion [K. W. Allen, S. M. Smith, W. C. Wake, A. O. van Raalte, The concept of an endurance limit for adhesive joints, International Journal of Adhesion and Adhesives, 5 (1985) 23-32, incorporated herein by reference in its entirety]. A number of studies on the corrosion inhibitive performance of polyurea coatings have been reported. Guoqiang et al. reported using a oligoaniline pendant group-grafted polyurea as a corrosion protection coating on cold rolled steel [G. Qu, F. Li, E. B. Berda, M. Chi, X. Liu, C. Wang, D. Chao, Electroactive polyurea bearing oligoaniline pendants: Electrochromic and anticorrosive properties, Polymer, 58 (2015) 60-66, incorporated herein by reference in its entirety]. The electroactive polyurea (EPU) coatings showed excellent corrosion protection properties with enhanced thermal stability and electrochemical properties. Maia et al. reported the synthesis of polyurea microcapsules loaded with 2-mercaptobenzothiazole (MBT) for corrosion protection of aluminum 2024 alloy [F. Maia, K. A. Yasakau, J. Carneiro, S. Kallip, J. Tedim, T. Henriques, A. Cabral, J. Venâncio, M. L. Zheludkevich, M. G. S. Ferreira, Corrosion protection of AA2024 by sol-gel coatings modified with MBT-loaded polyurea microcapsules, Chemical Engineering Journal, 283 (2016) 1108-1117, incorporated herein by reference in its entirety]. An improved adhesion enhancement and corrosion protective properties was found. Feng et al. reported the preparation of a polyurea and polyimide copolymer as a protective coating for 2024-T3 aluminum alloy [L. Feng, J. O. Iroh, Corrosion resistance and lifetime of polyimide-b-polyurea novel copolymer coatings, Progress in Organic Coatings, 77 (2014)

590-599, incorporated herein by reference in its entirety]. The protective coating was found to be highly hydrophobic with a water contact angle of 110°, a remarkably low surface energy, and improved corrosion protective properties. A few other studies on the corrosion inhibitive properties of polyurea coatings have been documented [V. V. Gite, P. D. Tatiya, R. J. Marathe, P. P. Mahulikar, D. G. Hundiwale, Microencapsulation of quinoline as a corrosion inhibitor in polyurea microcapsules for application in anticorrosive PU coatings, Progress in Organic Coatings, 83 (2015) 11-18; and A. Kakaroglou, M. Domini, I. De Graeve, Encapsulation and incorporation of sodium molybdate in polyurethane coatings and study of its corrosion inhibition on mild steel, Surface and Coatings Technology, 303 (2016) 330-341, each incorporated herein by reference in their entirety]. In all the studies conducted so far, polyurea has been utilized for coating metallic structures primarily due to its lack of solubility in aqueous medium. However, soluble corrosion inhibitors may be more advantageous than protective coatings in corrosion inhibition applications [B. D. B. Tiu, R. C. Advincula, Polymeric corrosion inhibitors for the oil and gas industry: Design principles and mechanism, Reactive and Functional Polymers, 95 (2015) 25-45, incorporated herein by reference in its entirety] although preparation and anticorrosion properties of water-soluble polyurea compositions have not been reported.

In view of the forgoing, one objective of the present disclosure is to provide methods of utilizing a water-soluble formulation containing polyurea pre-dissolved in a polar aprotic solvent for inhibiting corrosion of metallic substrates in an acidic aqueous environment such as that commonly found in industrial processes such as scale removal, acid pickling, and well acidification.

BRIEF SUMMARY OF THE INVENTION

According to a first aspect, the present disclosure relates to a method of inhibiting corrosion of a metallic substrate in contact with an aqueous corrosive medium. The method involves introducing a formulation containing a polyurea pre-dissolved in a polar aprotic solvent into the aqueous corrosive medium in contact with the metallic substrate, wherein (i) the formulation is devoid of epoxy ester resin, (ii) the polyurea comprises reacted units of a diaminoalkane and a diisocyanate, and (iii) the polar aprotic solvent is at least one selected from the group consisting of N-methyl-2-pyrrolidone, dimethylformamide, dimethyl sulfoxide, and 1,3-dimethyl-2-imidazolidinone.

In one embodiment, the diaminoalkane is at least one selected from the group consisting of ethylenediamine, 1,2-diaminopropane, 1,3-diaminopropane, 1,4-diaminobutane, 1,5-diaminopentane, and 1,6-diaminohexane.

In one embodiment, the diaminoalkane is 1,4-diaminobutane.

In one embodiment, the diisocyanate is toluene 2,4-diisocyanate, toluene-2,6-diisocyanatethe, or both.

In one embodiment, the diisocyanate is a mixture of toluene 2,4-diisocyanate and toluene-2,6-diisocyanate.

In one embodiment, a molar ratio of the toluene 2,4-diisocyanate to the toluene-2,6-diisocyanate is in a range of 1:1 to 10:1.

In one embodiment, the polyurea is in the form of porous microparticles.

In one embodiment, the porous microparticles are spherical.

In one embodiment, the polar aprotic solvent is N-methyl-2-pyrrolidone.

In one embodiment, a volume ratio of the polar aprotic solvent to the aqueous corrosive medium is in a range of 1:80 to 1:1,000.

In one embodiment, the polyurea is introduced into the aqueous corrosive medium at a concentration of 5-500 ppm.

In one embodiment, the metallic substrate contains steel.

In one embodiment, the metallic substrate contains carbon steel.

In one embodiment, the aqueous corrosive medium comprises at least one acid selected from the group consisting of hydrochloric acid, sulfuric acid, nitric acid, hydrofluoric acid, acetic acid, and formic acid.

In one embodiment, the aqueous corrosive medium comprises hydrochloric acid.

In one embodiment, the aqueous corrosive medium has a pH of 5 or below.

In one embodiment, the formulation is soluble in water.

In one embodiment, the aqueous corrosive medium has a temperature in a range of 4-80° C.

In one embodiment, the method has a corrosion inhibition efficiency in a range of 70-99.9%.

In one embodiment, the method imparts a corrosion rate in a range of 0.005-1.1 millimeter penetration per year (mmpy) to the metallic substrate.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
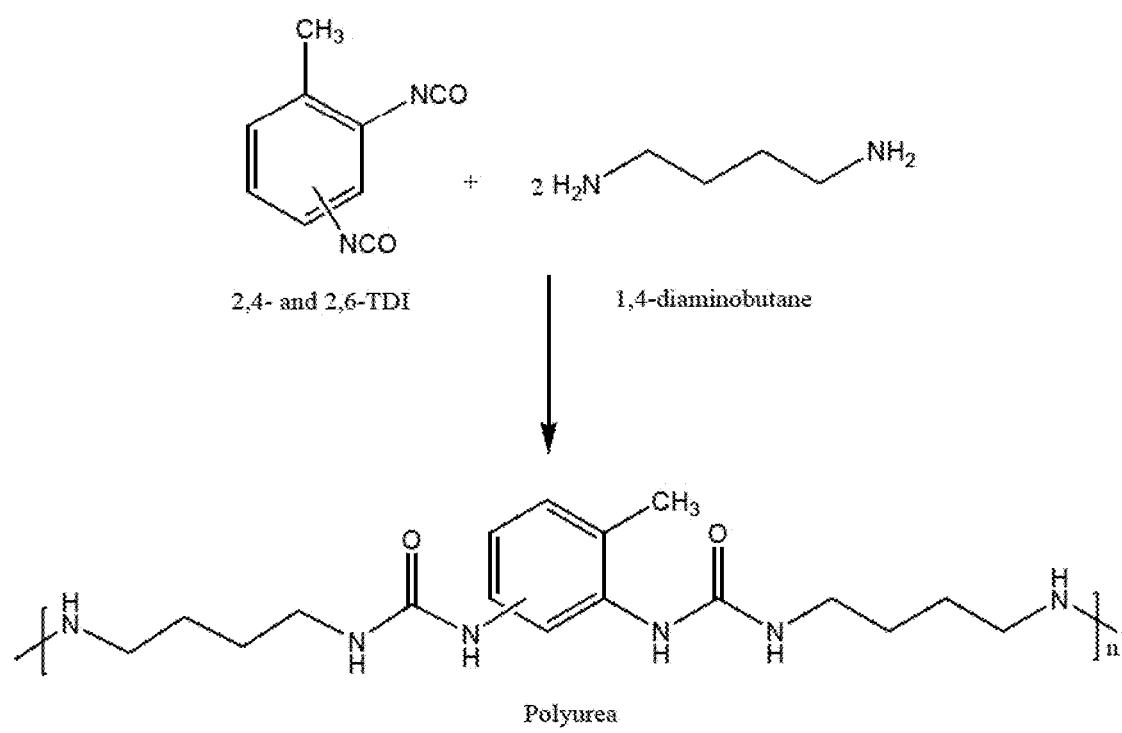
FIG. 1 shows a synthesis scheme for polyurea.

Embodiments of the present disclosure will now be described more fully hereinafter with reference to the accompanying drawings, in which some, but not all embodiments of the disclosure are shown.

As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

As used herein, the words "substantially similar", "substantially identical", "approximately", or "about" may be used when describing magnitude and/or position to indicate that the value and/or position described is within a reasonable expected range of values and/or positions. For example, a numeric value may have a value that is ±1% of the stated value (or range of values), ±2% of the stated value (or range of values), ±5% of the stated value (or range of values), ±10% of the stated value (or range of values), or ±15% of the stated value (or range of values).

As used herein, the terms "compound", "product" and "monomer" are used interchangeably, and are intended to refer to a chemical entity, whether in the solid, liquid or gaseous phase, and whether in a crude mixture or purified and isolated.

According to a first aspect, the present disclosure relates to a method of inhibiting corrosion of a metallic substrate in contact with an aqueous corrosive medium. The method involves introducing a formulation containing a polyurea pre-dissolved in a polar aprotic solvent into the aqueous corrosive medium in contact with the metallic substrate. Preferably, the polar aprotic solvent is at least one selected from the group consisting of N-methyl-2-pyrrolidone, dimethylformamide, dimethyl sulfoxide, and 1,3-dimethyl-2-imidazolidinone.

As used herein, monomers are molecules which can undergo polymerization, thereby contributing constitutional repeating units to the structures of a macromolecule or polymer matrix. The process by which monomers combine end to end to form a polymer matrix is referred to herein as "polymerization". As used herein, "crosslinking", "cross-linking", "crosslinked", "cross-linked", a "crosslink", or a "cross-link" refers to polymer matrixes containing branches that connect polymer chains via bonds that link one polymer chain to another. The crosslink may be an atom, a group of atoms, or a number of branch points connected by bonds, groups of atoms, or polymer chains. A crosslink may be formed by chemical reactions that are initiated by heat, pressure, radiation, change in pH, etc. with the presence of at least one crosslinking monomer having more than two extension points, which is a monomer having more than two reactive sites (i.e. a poly-functional monomer).

As used herein, the term "polyurea" refers to products of a polymerization reaction of a suitable di-functional or poly-functional isocyanate monomer with a suitable di-functional or poly-functional amine monomer. The polymerization provides urea or carbamide linkages (—NH—CO—NH—) between isocyanate and amine moieties of the polyurea network. Preferably, the isocyanate and the amine monomers used herein are di-functional, each having two reactive sites (e.g. isocyanate groups, amino groups). In one or more embodiments, the polyurea of the present disclosure comprises reacted units of a diamine and a diisocyanate.

As used herein a "copolymer" refers to a polymer derived from more than one species of monomer and are obtained by "copolymerization" of more than one species of monomer. Copolymers obtained by copolymerization of two monomer and/or oligomer species may be termed bipolymers, those obtained from three monomers may be termed terpolymers and those obtained from four monomers may be termed quarterpolymers, etc. In some embodiments, the polyurea of the present disclosure is a terpolymer, for example a terpolymer obtained from reaction between a diisocyanate and a mixture of two diamines with different chemical structures.

In a preferred embodiment, the polyurea of the present disclosure is a bipolymer obtained from reaction between a diisocyanate and a diamine.

The diisocyanate of the present disclosure may be a compound having two isocyanate groups, in particular, an isocyanate compound used for the synthesis of polyurea polymers. In a preferred embodiment, the diisocyanate is aromatic in nature by having one or more optionally substituted aromatic structures. The aromatic structure can be monocyclic or polycyclic. Examples of aromatic structures include, but are not limited to, benzene, naphthalene, anthracene, phenanthrene, pyrene, and biphenyl. Exemplary aromatic diisocyanates include, but are not limited to, toluene 2,4-diisocyanate, toluene-2,6-diisocyanatethe, 1,3-phenylene diisocyanate, 1,4-phenylene diisocyanate, 1,3-bis(1-isocyanato-1-methylethyl)benzene, 1-chloromethyl-2,4-diisocyanatobenzene, 4-chloro-6-methyl-1,3-phenylene diisocyanate, 4,4'-methylenebis(phenyl isocyanate), 2,4'-methylenebis(phenyl isocyanate), 2,2'-methylenebis(phenyl isocyanate), m-xylylene diisocyanate, and 1,5-naphthalene diisocyanate. It is equally envisaged that the currently disclosed method may be adapted to include aliphatic diisocyanates such as isophorone diisocyanate, trimethylene diisocyanate, tetramethylene diisocyanate, pentamethylene diisocyanate, hexamethylene diisocyanate, 2,3-butylene diisocyanate, 1,3-butylene diisocyanate, 2,4,4-trimethylhexamethylene diisocyanate, 4,4'-dicyclohexylmethane diisocyanate, dodecamethylene diisocyanate, 1,3-cyclopentane diisocyanate, 1,3-cyclohexane diisocyanate, 1,4-cyclohexane diisocyanate, methyl-2,4-cyclohexane diisocyanate, and methyl-2,6-cyclohexane diisocyanate. Alternatively, polyisocyanate such as 2,4,6-triisocyanate toluene, 1,3,5-triisocyanate benzene, 4,4'-triphenylmethane triisocyanate may be used in addition to or in lieu of the diisocyanate.

In one or more embodiments, the diisocyanate of the present disclosure is toluene 2,4-diisocyanate, toluene-2,6-diisocyanatethe, or both. In a preferred embodiment, the diisocyanate is a mixture of toluene 2,4-diisocyanate and toluene-2,6-diisocyanate. Preferably, a molar ratio of the toluene 2,4-diisocyanate to the toluene-2,6-diisocyanate of the mixture is in a range of 1:1 to 10:1, 1.5:1 to 9:1, 2:1 to 8:1, 2.5:1 to 7:1, 3:1 to 6:1, 3.5:1 to 5:1, or about 4:1. The mixture of toluene 2,4-diisocyanate and toluene-2,6-diisocyanate may be available from commercial vendors including, without limitation, Sigma Aldrich, Alfa Aesar, and TCI America.

In a preferred embodiment, diamines of the present disclosure are aliphatic diaminoalkanes including, but not limited to, ethylenediamine, 1,2-diaminopropane, 1,3-diaminopropane, 1,4-diaminobutane, 1,5-diaminopentane, 1,6-diaminohexane, 1,12-diaminododecane, 2,5-diamino-2,5-dimethylhexane, trimethyl-1,6-hexane-diamine, piperazine, 1,4-diaminocyclohexane, isophoronediamine, N-cyclohexyl-1,3-propanediamine, bis-(4-amino-cyclohexyl) methane, and bis-(4-amino-3-methyl-cyclohexyl)-methane. It is equally envisaged that the currently disclosed method may be adapted to include polyamines such as diethylenetriamine, triethylenetetraamine, tetraethylenepentamine, pentaethylenehexamine, dipropylenetriamine, tripropylenetetraamine, bis-(3-aminopropyl)amine in addition to or in lieu of the aforementioned diaminoalkanes. Alternatively, suitable aromatic diamines may be used. Non-limiting examples of aromatic diamines include o-, m- and p-phenylenediamine, 1,2-diamino-3-methylbenzene, 1,3-diamino-4-methylbenzene(2,4-diaminotoluene), 1,3-bisaminomethyl-4,6-dimethylbenzene, 2,4- and 2,6-diamino-3,5-diethyltoluene, 1,4- and 1,6-diaminonaphthalene, 1,8- and 2,7-diaminonaphthalene, bis-(4-amino-phenyl)-methane, 2,2-bis-(4-aminophenyl)-propane, and 4,4'-oxybisaniline. In a preferred embodiment, the diamine of the present disclosure is at least one diaminoalkane selected from the group consisting of ethylenediamine, 1,2-diaminopropane, 1,3-diaminopropane, 1,4-diaminobutane, 1,5-diaminopentane, and 1,6-diaminohexane. In a most preferred embodiment, the diaminoalkane of the present disclosure is 1,4-diaminobutane.

In addition to the diamines and/or polyamines, additional monomers which are reactive towards isocyanate groups may also be used, including chain extending and termination agents, such as monoamines (e.g. ammonia, C1-C18 alkylamines, arylamines, C1-C12 alkylarylamines), as well as aliphatic, cycloaliphatic, and aromatic mono-, di-, and poly-C1 to C18 alcohols. In particular, if a diol and/or a polyol are used in addition to the diamine, a hybrid polymer comprising polyurea-urethanes may be formed according to the current method.

The polyurea of the present disclosure may have a wide molecular weight distribution. In one embodiment, the polyurea of the present disclosure has an average molecular weight of 1-100 kDa, preferably 2-80 kDa, preferably 5-60 kDa, preferably 10-40 kDa, preferably 15-35 kDa, preferably 20-30 kDa.

In a preferred embodiment, the polyurea may be prepared by the steps involving mixing the aforementioned diisocyanate (e.g. toluene 2,4-diisocyanate and toluene-2,6-diisocyanate) and diamine (e.g. 1,4-diaminobutane) in a solvent to form a reaction mixture, and heating the reaction mixture thereby forming the polyurea. Suitable solvents including, but not limited to, acetonitrile, tetrahydrofuran (THF), dimethylformamide (DMF), dimethyl sulfoxide (DMSO), ethyl acetate, butyl acetate, 1,3-dimethyl-2-imidazolidinone, and 1-methyl-2-pyrrolidone (NMP) may be used in preparing the polyurea. In a preferred embodiment, acetonitrile is used as the solvent. Other organic solvents that may be used in addition to or in lieu of acetonitrile include, without limitation, butane, pentane, n-hexane, cyclohexane, n-octane, isooctane, petroleum ether, benzene, toluene, xylene, methylene chloride, chlorobenzene, diethyl ether, and acetone.

Prior to the mixing step, the diamine may be dissolved in the solvent to form a first mixture, and the diisocyanate is mixed with the first mixture to form the reaction mixture. Alternatively, the aforementioned reagents (i.e. diamine and diisocyanate) may be dissolved in the solvent separately to form respective solutions, which are then mixed to form the reaction mixture. The mixing may occur via stirring, shaking, swirling, sonicating, blending, or by otherwise agitating the reaction mixture. The mixing may be performed by employing a rotary shaker, a magnetic stirrer, a centrifugal mixer, or an overhead stirrer. In another embodiment, the reaction mixture is left to stand (i.e. not stirred). In a preferred embodiment, the reaction mixture is agitated using a magnetic stirrer or an overhead stirrer at a speed of 100-2,000 rpm, 200-1,500 rpm, 300-1,000 rpm, 400-800 rpm, 500-700 rpm, or about 600 rpm at a temperature of 40-95° C., 45-90° C., 50-85° C., 55-80° C., 60-75° C., or 65-70° C. for 0.5-12 hours, 1-10 hours, 2-8 hours, 3-7 hours, or about 6 hours. An external heat source, such as a water bath or an oil bath, an oven, microwave, or a heating mantle, may be employed to heat the reaction mixture. In one or more embodiments, a molar ratio of the diamine to the diisocyanate is in the range of 1:1 to 4:1, preferably 1.2:1 to 3.5:1, more preferably 1.5:1 to 3:1, or about 2:1. However, in certain embodiments, the molar ratio of the diamine to the diisocyanate is less than 1:1 or greater than 4:1. In one embodiment, the diamine is present in the reaction mixture at a concentration of 0.05-10 M, preferably 0.1-5 M, preferably 0.2-2 M, preferably 0.4-1 M, or about 0.5 M. In a related embodiment, the diisocyanate is present in the reaction mixture at a concentration of 0.02-8 M, preferably 0.04-4 M, preferably 0.08-2 M, preferably 0.1-1 M, or about 0.25 M. In a preferred embodiment, the polyurea is collected as a powder that may be separated and washed in acetone and then dried. In one embodiment, the powder may be dried under vacuum until a constant weight is achieved. In a preferred embodiment, the method used herein has a polyurea product yield of at least 85%, preferably at least 90%, preferably at least 92%, preferably at least 94%, preferably at least 96%, preferably at least 97%, preferably at least 98%, preferably at least 99%. The product yield is calculated as (weight of polyurea obtained/combined weight of diamine and diisocyanate)×100%.

A particle is defined as a small object that behaves as a whole unit with respect to its transport and properties. Before pre-dissolving in a polar aprotic solvent, the polyurea of the present disclosure in any of its embodiments may be in the form of particles of the same shape or different shapes, and of the same size or different sizes. An average diameter (e.g., average particle diameter) of the particle, as used herein, refers to the average linear distance measured from one point on the particle through the center of the particle to a point directly across from it. As used herein, microparticles are particles having an average diameter between 0.1 and 1,000 μm in size. Nanoparticles are particles having an average diameter between 1 and 100 nm in size. In one embodiment, the polyurea used herein may be in the form of microparticles having an average diameter in a range of 0.1-1,000 μm, 1-750 μm, 5-600 μm, 10-500 μm, 25-400 μm, 50-300 μm, 75-200 μm, or 100-150 μm. In another embodiment, the polyurea may be in the form of nanoparticles having an average diameter in a range of 1-99 nm, 5-90 nm, 10-80 nm, 20-70 nm, 30-60 nm, or 40-50 nm. In a preferred embodiment, the polyurea is in the form of microparticles.

The particles (e.g. nanoparticles, microparticles) of the polyurea may be spherical, ellipsoidal, oblong, ovoidal, or some other rounded shape. In an alternative embodiment, the particles may be angular, rectangular, prismoidal, or some other angular shape. In a preferred embodiment, the polyurea particles are spherical. Microspheres are spherical microparticles. In a more preferred embodiment, the polyurea is in the form of microspheres having a diameter of 1-1,000 μm, 5-900 μm, 10-800 μm, 20-700 μm, 40-600 μm, 80-500 μm, 100-400 μm, or 200-300 μm. The size and shape of particles may be analyzed by techniques such as dynamic light scattering (DLS), scanning electron microscopy (SEM), transmission electron microscopy (TEM), and/or atomic force microscopy (AFM).

In a preferred embodiment, the polyurea particles of the present disclosure are monodisperse, having a coefficient of variation or relative standard deviation, expressed as a percentage and defined as the ratio of the particle size standard deviation ($\sigma$) to the particle size mean ($\mu$) multiplied by 100 of less than 25%, preferably less than 10%, preferably less than 8%, preferably less than 6%, preferably less than 5%, preferably less than 4%, preferably less than 3%, preferably less than 2%. In a preferred embodiment, the polyurea particles used herein are monodisperse having a particle size distribution ranging from 80% of the average particle size to 120% of the average particle size, preferably 90-110%, preferably 95-105% of the average particle size.

The surface of the polyurea particles may be mesoporous or microporous. The term "microporous" refers to a surface having an average pore diameter of less than 2 nm (20 Å), while the term "mesoporous" refers to a surface having an average pore diameter of 2-50 (20-500 Å) nm. In one embodiment, the polyurea used herein in any of its embodiments is mesoporous and has a pore size of 20-500 Å, 50-400 Å, 100-300 Å, 120-250 Å, 150-200 Å, or 170-190 Å. In a more preferred embodiment, the polyurea is microporous and has a pore size of 5-19 Å, preferably 8-18 Å, preferably 10-17 Å, preferably 12-16 Å, preferably 14-15 A. In certain embodiments, the polyurea has porous structures with a pore size larger than 500 Å (50 nm), for example, a pore size of 80 nm, 100 nm, 500 nm, 1 μm, 10 μm, 50 μm, or 100 μm. Pore size may be determined by techniques including, but not limited to, gas adsorption (e.g. $N_2$ adsorption), mercury intrusion porosimetry, and imaging techniques such as scanning electron microscopy (SEM), and x-ray computed tomography (XRCT).

The method of the present disclosure involves inhibiting corrosion of a metallic substrate by mixing or introducing the formulation containing the aforementioned polyurea with/into an aqueous corrosive medium in contact with the metallic substrate. Alternatively, the method of the present disclosure may be applied for inhibiting corrosion of metallic substrates when the aqueous corrosive medium (e.g. aqueous acidic medium) is used for acid pickling of the metallic substrates, scale removal and oil well acidification of a system involving the metallic substrates. In certain embodiments, the method involves contacting and coating the metallic substrate with the formulation prior to, during, or subsequent to immersion in a corrosive medium. Preferably, the formulation will be contacted with, or continuously or intermittently applied to, the surfaces of metallic substrates, preferably in a space or volume where continued contact between the metallic substrate and the formulation can be maintained or refreshed.

As used herein, the formulation of the present disclosure includes at least the polyurea and the polar aprotic solvent to pre-dissolve the polyurea. In one or more embodiments, the polyurea is pre-dissolved in a suitable solvent prior to the introducing step. Polyurea is generally known to be insoluble in an aqueous medium. The pre-dissolving step is applied herein to enhance the dispersion and solubility of the polyurea in the aqueous corrosive medium.

Preferably, the solvent used to pre-dissolve the polyurea is at least partially soluble in water and preferably miscible with water. More preferably, the solvent used is a polar aprotic solvent. Other considerations in the selection of solvents include low toxicity, low corrosive activity, low environmental hazard potential, availability, and cost. Exemplary polar aprotic solvents include, but are not limited to, N-methyl-2-pyrrolidone (NMP), dimethylformamide (DMF), dimethyl sulfoxide (DMSO), 1,3-dimethyl-2-imidazolidinone, acetone, tetrahydrofuran (THF), ethyl acetate, and acetonitrile. In a preferred embodiment, the polar aprotic solvent used herein to pre-dissolve the polyurea is at least one selected from the group consisting of N-methyl-2-pyrrolidone, dimethylformamide, dimethyl sulfoxide, and 1,3-dimethyl-2-imidazolidinone. In a most preferred embodiment, the polar aprotic solvent used herein is N-methyl-2-pyrrolidone. It is equally envisaged that the present method may be adapted to incorporate other organic solvents such as methanol, ethanol, n-propanol, iso-propanol, n-butanol, 1,3-butanediol, 1,4-butanediol, 1,4-dioxane, furfuryl alcohol, and mixtures thereof. The pre-dissolving step may be performed via agitation at an optionally elevated temperature. Methods of agitation include, without limitation, swirling by hand, stirring with a magnetic stir plate or a mechanical stirrer, shaking with a rotary shaker, using a disperser (e.g. a high shear disperser), and sonicating using an ultrasonic bath or an ultrasonic probe. In one embodiment, a weight ratio of the polyurea to the solvent pre-dissolving the polyurea is in a range of 1:2,500 to 1:2, preferably 1:2,000 to 1:5, preferably 1:1,000 to 1:10, preferably 1:800 to 1:25, preferably 1:600 to 1:50, preferably 1:400 to 1:60, preferably 1:200 to 1:80, preferably 1:150 to 1:90, or about 1:100.

In one or more embodiments, a volume ratio of the polar aprotic solvent (e.g. NMP) to the aqueous corrosive medium is in a range of 1:80 to 1:1,000, preferably 1:82 to 1:800, preferably 1:84 to 1:600, preferably 1:86 to 1:500, preferably 1:88 to 1:400, preferably 1:90 to 1:300, preferably 1:92 to 1:250, preferably 1:94 to 1:200, preferably 1:95 to 1:150, preferably 1:96 to 1:125, preferably 1:97 to 1:120, preferably 1:98 to 1:110, preferably 1:99 to 1:105, or about 1:100. However, in certain embodiments, the volume ratio of the polar aprotic solvent (e.g. NMP) to the aqueous corrosive medium is less than 1:1000 or greater than 1:80.

As used herein, an epoxy ester resin is a polymer having epoxy ester groups (—CO—O—CH$_2$—CHOH—) formed by reacting epoxy groups with carboxylic acids. In one or more embodiments, the formulation is substantially free of epoxy ester resin, for instance, the formulation comprises less than 0.01 wt % of epoxy ester resin, preferably less than 0.005 wt %, more preferably less than 0.001 wt % of epoxy ester resin, relative to a total weight of the formulation. In at least one embodiment, the formulation is devoid of epoxy ester resin. The epoxy ester may be an unsaturated epoxy ester resin formed from the reaction of an aromatic di-epoxide with an unsaturated C15 to C18 fatty acid. In at least one embodiment, the formulation of the present method consists essentially of the polyurea and the polar aprotic solvent.

As used herein, a "corrosion inhibitor" refers to a chemical compound or formulation that when added to a material and/or contacted with a corrodible substrate, typically a metal or an alloy, decreases the corrosion rates of the material. Inhibitors often play an important role in the oil extraction and processing industries where they have always been considered to be the first line of defense against corrosion. The formulation of the current method (e.g. the pre-dissolved polyurea) may interact with the metallic substrate and form a cohesive and insoluble film on the surface of the substrate. Organic inhibitor that contains heteroatoms (e.g. N, O, and S) may be adsorbed on a metallic surface thus blocking the active corrosion sites. In a preferred embodiment, the formulation (e.g. the polyurea) is adsorbed onto the metallic substrate through a chemisorption process which forms a protective film over the surface of the substrate (see Examples 11 and 12, FIGS. 9, 10, 11A-D). In one embodiment, the protective film generated according to the current method has a thickness of 1-500 μm, 5-250 μm, 10-125 μm, or 25-50 μm.

As used herein, "parts per million" or "ppm" refers to an expression of concentration by mass or weight. For example, 1 ppm of a formulation denotes a 1:1,000,000 weight ratio of formulation per total weight of fluid (e.g. liquids, gases or combinations thereof) contacting the metallic substrate. Alternatively, 1 ppm of a formulation denotes a 1:1,000,000 weight ratio of the formulation per total weight of corrosive fluid (e.g. acid pickling solutions, scale removal reagents) contained or carried within an infrastructure having the metallic substrates.

In one or more embodiments, the method disclosed herein involves introducing the polyurea into the aqueous corrosive medium at a concentration of 5-500 ppm, 10-400 ppm, 20-300 ppm, 30-250 ppm, 40-200 ppm, 50-150 ppm, 60-125 ppm, 70-100 ppm, or 80-90 ppm. However, in certain embodiments, the polyurea may be introduced into the aqueous corrosive medium at a concentration less than 5 ppm or greater than 500 ppm.

The method disclosed herein in any its embodiments may be effective in protecting the aforementioned metallic substrate against corrosion in various environments such as acidic and/or high salt concentration environments. In one or more embodiments, the corrosive medium contains at least one acid. The acid may be acidic reagents commonly used for acid pickling, scale removal, well acidification, and acid fracturing processes. The acid may be in liquid or gas forms and include, but are not limited to, hydrochloric acid (HCl), sulfuric acid (H$_2$SO$_4$), nitric acid (HNO$_3$), hydrofluoric acid (HF), acetic acid (CH$_3$COOH), formic acid (HCOOH), citric acid, phosphoric acid, carbon dioxide (CO$_2$), and hydrogen sulfide (H$_2$S). These acids may be present in the aqueous corrosive medium at saturated concentrations, or at a concentration in a range of 0.01-10 M, 0.05-8 M, 0.1-6 M, 0.25-4 M, 0.5-3 M, 0.75-2 M, or about 1 M. In at least one embodiment, the aqueous corrosive medium contains hydrochloric acid. In a preferred embodiment, the aqueous corrosive medium has a pH of 5 or below, for example, a pH in a range of 1-5, 1.5-4.5, 2-4, 2.5-3.5, or 2-3.

Inorganic salts such as sodium chloride have been known to cause serious corrosion to steels. As used herein, brine is an aqueous mixture of one or more soluble salts (e.g. sodium chloride, potassium chloride, calcium chloride, calcium bromide, sodium bromide, potassium bromide, zinc bromide, magnesium chloride). Seawater or water from a salt lake may be considered a brine. In some embodiments, brine may be present in the aqueous corrosive medium. For example, the aqueous corrosive medium may contain 1-10 wt %, 2-5 wt %, or about 3.5 wt % sodium chloride, 0.1-1 wt %, 0.2-0.5 wt %, or about 0.3 wt % calcium chloride, as well as 0.05-1 wt %, 0.1-0.4 wt %, or about 0.2 wt % magnesium chloride, each relative to a total weight of the aqueous corrosive medium. In certain embodiments, the aqueous corrosive medium contains the acid and brine.

Miscibility can be estimated by using solubility parameters (δ), which are tabulated for many different polymers and solvents. The Hildebrand solubility parameter provides a numerical estimate of the degree of interaction between materials, and can be a good indication of solubility, particularly for materials such as polymers. Materials with similar values of δ are likely to be miscible. In a preferred embodiment, the formulation of the present disclosure (i.e. the polyurea pre-dissolved in the polar aprotic solvent) is soluble in water (δ=23.4 (cal/cm$^3$)$^{1/2}$). In a preferred embodiment, the formulation of the present disclosure has a Hildebrand solubility parameter of 5-25 (cal/cm$^3$)$^{1/2}$, preferably 8-22 (cal/cm$^3$)$^{1/2}$, more preferably 10-20 (cal/cm$^3$)$^{1/2}$. In a preferred embodiment, the formulation (i.e. the polyurea pre-dissolved in the polar aprotic solvent) is soluble in water. In another preferred embodiment, the formulation is soluble in an acidic aqueous medium with a pH of up to 6.5, for example a pH in a range of 1-6.5, 1.5-6, 2-5.5, 2.5-5, 3-4.5, or 3.5-4. In a preferred embodiment, the formulation is soluble in the aqueous corrosive medium described previously.

Preferably, for applications in the oil and gas industry, the formulation of the present invention is stable at high temperatures. Oil and gas wells can reach temperatures higher than 120° C. (e.g. 130-140° C.). In one or more embodiments, the aqueous corrosive medium has a temperature in a range of 4-120° C., 10-100° C., 20-80° C., 30-70° C., 40-60° C., or 45-55° C.

As used herein, "corrosion" refers to the process which converts refined metals to their more stable oxide. It is the gradual loss of a material (usually metals) by chemical reaction with their environment. Commonly, this means electrochemical oxidation of metal in reaction with an oxidant such as oxygen. Rusting, the formation of iron oxides is a well-known example of electrochemical corrosion producing oxide(s) and/or salt(s) of the original metal. Corrosion degrades the useful properties of materials and structures including strength, appearance and permeability to liquids and gases. Many structural alloys corrode merely from exposure to moisture in air, but the process can be strongly affected by exposure to certain substances. Because corrosion is a diffusion-controlled process, it generally occurs on exposed surfaces.

Exemplary metallic substrates applicable to the present disclosure include, but are not limited to, copper, copper alloys (e.g. brass or bronze), aluminum, aluminum alloys (e.g. aluminum-magnesium, nickel-aluminum, aluminum-silicon), nickel, nickel alloys (e.g. nickel-titanium or nickel-chromium), iron, iron alloys, carbon steels, alloy steels, stainless steels, and tool steels.

Steel is an alloy of iron and carbon that is widely used in construction and other applications because of its high tensile strength and low cost. Carbon, other elements, and inclusions within iron act as hardening agents that prevent the movement of dislocations that naturally exist in the iron atom crystal lattices. The carbon in typical steel alloys may contribute up to 2.1% of its weight.

Steels can be broadly categorized into four groups based on their chemical compositions: carbon steels, alloy steels, stainless steels, and tool steels. Carbon steels contain trace amounts of alloying elements and account for 90% of total steel production. Carbon steels can be further categorized intro three groups depending on their carbon content: low carbon steels/mild steels contain up to 0.3% carbon, medium carbon steels contain 0.3-0.6% carbon, and high carbon steels contain more than 0.6% carbon. Alloys steels contain alloying elements (e.g. manganese, silicon, nickel, titanium, copper, chromium and aluminum) in varying proportions in order to manipulate the steel's properties, such as its hardenability, corrosion resistance, strength, formability, weldability or ductility. Stainless steels generally contain between 10-20% chromium as the main alloying element and are valued for high corrosion resistance. With over 11% chromium, steel is about 200 times more resistant to corrosion than mild steel. These steels can be divided into three groups based on their crystalline structure: austenitic steels, ferritic steels and martensitic steels. Tool steels contain tungsten, molybdenum, cobalt and vanadium in varying quantities to increase heat resistance and durability, making them ideal for cutting and drilling equipment.

In one embodiment, the metallic substrate comprises steel, carbon steel, low carbon steel, mild steel, medium carbon steel, high carbon steel, alloy steel, stainless steel, austenitic steel, ferritic steel, martensitic steel, tool steel, or mixtures thereof. Preferably, the metallic substrate comprises carbon steel. More preferably, the metallic substrate is a mild steel with a carbon content of up to 0.3%, preferably a carbon content of 0.1-0.25%, preferably a carbon content of 0.15-0.2%, for example, 1018 (e.g. AISI 1018), ASTM A36, 12L14, ASTM A653, and other steel alloys such as A366/1008, A513 (alloy 1020-1026), 8620 alloy.

As used herein, "systems" include, but are not limited to, systems used in petroleum (e.g., crude oil and its products) or natural gas production, such as well casing, transport pipelines, drilling and other oil field applications, transport, separation, refining, storage, and other liquid natural gas and petroleum-related applications, geothermal wells, water wells; cooling water systems including open recirculating, closed, and once-through systems; cisterns and water collection or holding systems, solar water heating systems, boilers and boiler water systems or systems used in power generation, mineral process waters including mineral washing, flotation and benefaction; paper mill digesters, washers, bleach plants, white water systems and mill water systems; black liquor evaporators in the pulp industry; gas scrubbers and air washers; continuous casting processes in the metallurgical industry; air conditioning and refrigeration systems; building fire protection heating water, such as pasteurization water; water reclamation and purification systems; membrane filtration water systems; food processing streams and waste treatment systems as well as in clarifiers, liquid-solid applications, municipal sewage treatment systems; and industrial or municipal water distribution systems.

In preferred embodiments, the metallic substrate is part of a system for oil or gas production, transportation, or refining. The metallic substrate may be part of a system used in the drilling, petroleum, oil and gas industries including drills, drill bits, pumps, compressors, pipelines, and other tools and equipment, electric parts such as transformers, power generators and electric motors, vehicle parts including those of boats, autos, trucks, aircraft, and military vehicles. Tools, including construction, automotive, household, and kitchen tools, are included.

Corrosion rate is the speed at which metals undergo deterioration within a particular environment. The rate may depend on environmental conditions and the condition or type of metal. Factors often used to calculate or determine corrosion rate include, but are not limited to, weight loss (reduction in weight during reference time), area (initial surface area), time (length of reference time) and density. Corrosion rate is typically computed using millimeter penetration per year (mmpy) or mils per year (mpy). Mils penetration per year (mpy) is a unit of measurement equal to approximately one thousandth of an inch. In metric expression 1 mil is equal to 0.0254 mm, accordingly, 1 mpy is equal to 0.0254 mmpy.

In one or more embodiments, the method of the present disclosure in any of its embodiments imparts a corrosion rate in a range of 0.005-1.1 millimeter penetration per year (mmpy) to the metallic substrate, preferably 0.01-1 mmpy, preferably 0.02-0.5 mmpy, preferably 0.04-0.4 mmpy, preferably 0.05-0.3 mmpy, preferably 0.075-0.2 mmpy, preferably 0.1-0.18 mmpy, preferably 0.12-0.15 millimeter penetration per year (mmpy). In a preferred embodiment, the corrosion rate of the metallic substrate according to the presently disclosed method may be slowed by 2-100 mmpy relative to the corrosion rate of a substantially identical metallic substrate exposed to a substantially identical aqueous corrosive medium lacking the formulation, preferably slowed by 10-96 mmpy, 20-90 mmpy, 30-80 mmpy, 40-70 mmpy, or 50-60 mmpy relative to the corrosion rate of a substantially identical metallic substrate exposed to a substantially identical aqueous corrosive medium lacking the formulation (see Table 2).

Corrosion inhibition efficiencies may be measured with the Tafel extrapolation, linear polarization resistance (LPR), potentiodynamic polarization (PDP), gravimetric or other similar methods. In a preferred embodiment, the method described herein in any of its embodiments achieves a corrosion inhibition efficiency in a range of 70-100%, 75-99.9%, 80-99%, 85-98%, 90-97%, 92-96%, or 94-95%.

In a preferred embodiment, the method disclosed herein has a corrosion inhibition efficiency in a range of 70-100% when the polyurea of the formulation is introduced to the aqueous corrosive medium at a concentration ranging from 1-200 ppm, preferably a corrosion inhibition efficiency greater than 95% at a concentration of the polyurea of at least 100 ppm, preferably greater than 95% at a concentration of the polyurea of up to 75 ppm, preferably greater than 95% at a concentration of the polyurea of up to 50 ppm, preferably greater than 95% at a concentration of the polyurea of up to 40 ppm, preferably greater than 95% at a concentration of the polyurea of up to 30 ppm, preferably greater than 95% at a concentration of the polyurea of up to 25 ppm, preferably greater than 95% at a concentration of the polyurea of up to 20 ppm (see Tables 2 and 3).

The examples below are intended to further illustrate protocols for preparing, characterizing the polyurea and the formulation containing the polyurea pre-dissolved in the polar aprotic solvent, and uses thereof, and are not intended to limit the scope of the claims.

Example 1

Reagents

All chemicals utilized in the current disclosure were of high purity and used without further purifications. Toluene diisocyanate (TDI, a mixture of 2,4-(80%) and 2,6-(20%)-isomers) was purchased from Fluka Chemika (Germany). 1,4-diaminobutane (DAB) from Alfa Aesar (Germany), acetonitrile from Merck (Germany), hydrochloric acid from Fisher Scientific (USA) and N-methyl-2-pyrrolidone from Riedel—de Haen (Germany). 1.0 M HCl solution used for corrosion tests was prepared by dilution using double distilled water.

Example 2

Synthesis of Polyurea (PU)

An established procedure was utilized in the synthesis of PU with modifications (FIG. 1) [F. Zhang, X. Jiang, X. Zhu, Z. Chen, X. Z. Kong, Preparation of uniform and porous polyurea microspheres of large size through interfacial polymerization of toluene diisocyanate in water solution of ethylene diamine, Chemical Engineering Journal, 303 (2016) 48-55, incorporated herein by reference in its entirety]. Diaminobutane, DAB (0.88 g, 10 mmol) was added to 20 mL acetonitrile in a three-necked round bottomed flask and immersed in an oil bath at 60° C. until it was dissolved completely. Thereafter, toluene diisocyanate, TDI (0.90 g, 5 mmol) was added drop wise to DAB while stirring at 600 rpm, and the polymerization was allowed to continue for 6 h. At the end of the reaction, a whitish product was formed which was filtered, washed in acetone, and dried up in a vacuum oven at 70° C. until a constant mass was reached. The resulting powder weighed 1.70 g (96% yield). FTIR; 3350 cm$^{-1}$ (s), 3000 cm$^{-1}$ (m), 1650 cm$^{-1}$ (s), 1550 cm$^{-1}$ (s), 1230 cm$^{-1}$ (s), 700 cm$^{-1}$ (w).

Example 3

Characterization of PU $^1$H and $^{13}$C NMR spectra of the synthesized PU in DMSO-d$_6$ were recorded on a JEOL 500 MHz NMR spectrometer using TMS as internal standard. IR spectrum was recorded on a Perkin Elmer 16F PC FTIR spectrometer using KBr as standard. Thermogravimetric analysis (TGA) was done on an SDT analyzer (Q600: TA instruments, USA). Approximately 5.8 mg of the polymer was taken in an aluminum crucible. The temperature was raised at a controlled rate of 15° C./min. The analysis was made over a temperature range of 20-1000° C. in air. Morphological studies of the steel specimen after exposure to 1.0 M HCl in the absence and presence of PU was carried out using scanning electron microscope, SEM (Genesis-2120 Emcrafts, Korea) and x-ray photoelectron spectrometer, XPS (Thermo Scientific ESCALAB 250 Xi).

Example 4

Electrochemical Measurements

Electrochemical measurements were performed in a jacketed electrochemical cell kit with three-electrode compartments (Gamry). Mild steel bar AISI 1018 with the following compositions; C, 0.15-0.20%; Mn, 0.60-0.90%; P, 0.04%; S, 0.05% and balance Fe was used as the sample specimen, saturated calomel electrode (SCE) and carbon graphite as the reference and counter electrodes, respectively. The sample specimen was polished sequentially using silicon carbide emery papers of different grit size (120-800), rinsed with distilled water, placed in an ultrasonic acetone bath to remove possible residue due to polishing, rinsed with acetone, dried in warm air, and stored in a moisture-free desiccator before use.

Gamry potentiostat/galvanostat/ZRA (Reference 600) equipped with a Gamry framework interface was used for electrochemical studies. Gamry Echem Analyst version 6.03 was used for data analysis and fittings. Open circuit potential measurements were carried out during two hours of immersion in freshly prepared polymer solutions.

Polarization (Tafel) curves were obtained by scanning the potential at 0.5 mV/s in the range +250 mV to −250 mV against the open circuit potential ($E_{ocp}$). Corrosion potential ($E_{corr}$/V vs SCE) and corrosion current density ($i_{corr}$, A cm$^{-2}$) were obtained by extrapolation of anodic (βa) and cathodic (βc) branches of the Tafel curves.

Electrochemical impedance spectroscopy measurements (EIS) were carried out at open circuit potential ($E_{ocp}$ vs SCE) in the frequency range 100 KHz to 100 mHz, with an amplitude of perturbation 10 mV r.m.s.

Example 5

DFT Calculations

DFT calculations were carried out using the Gaussian 09 package [M. J. Frisch, G. W. Trucks, H. B. Schlegel, G. E. Scuseria, M. A. Robb, J. R. Cheeseman, G. Scalmani, V. Barone, B. Mennucci, G. A. Petersson, H. Nakatsuji, M. Caricato, X. Li, H. P. Hratchian, A. F. Izmaylov, J. Bloino, G. Zheng, J. L. Sonnenberg, M. Hada, M. Ehara, K. Toyota, R. Fukuda, J. Hasegawa, M. Ishida, T. Nakajima, Y. Honda, O. Kitao, H. Nakai, T. Vreven, J. A. Montgomery, J. E. Peralta, F. Ogliaro, M. Bearpark, J. J. Heyd, E. Brothers, K. N. Kudin, V. N. Staroverov, R. Kobayashi, J. Normand, K. Raghavachari, A. Rendell, J. C. Burant, S. S. Iyengar, J. Tomasi, M. Cossi, N. Rega, J. M. Millam, M. Klene, J. E. Knox, J. B. Cross, V. Bakken, C. Adamo, J. Jaramillo, R. Gomperts, R. E. Stratmann, O. Yazyev, A. J. Austin, R. Cammi, C. Pomelli, J. W. Ochterski, R. L. Martin, K. Morokuma, V. G. Zakrzewski, G. A. Voth, P. Salvador, J. J. Dannenberg, S. Dapprich, A. D. Daniels, Farkas, J. B. Foresman, J. V. Ortiz, J. Cioslowski, D. J. Fox, Gaussian 09, Revision B.01, in, Wallingford CT, 2009], with hybrid function of the Becke three-parameters Lee, Yang and Par (B3LYP) method and the 6-31G(d) basis set. Structural geometry of each molecule was tested and the vibrational frequency analysis shows no imaginary frequencies. Structural features such as global hardness ($\eta$), electron affinity (A), ionization potential (I), electronegativity ($\chi$), and dipole moment ($\mu$) were subsequently calculated.

Example 6

Results and Discussions: Characterization of PU

NMR spectroscopy was utilized to investigate the formation and purity of polyurea synthesized in the present study. In order to better understand the results, the monomers, 1,4-diaminobutane (DAB) and TDI (a mixture of 2,4- and 2,6-isomers) were also analyzed using $^{13}$C and $^{1}$H NMR spectroscopies.

Figures 2A, 2B:
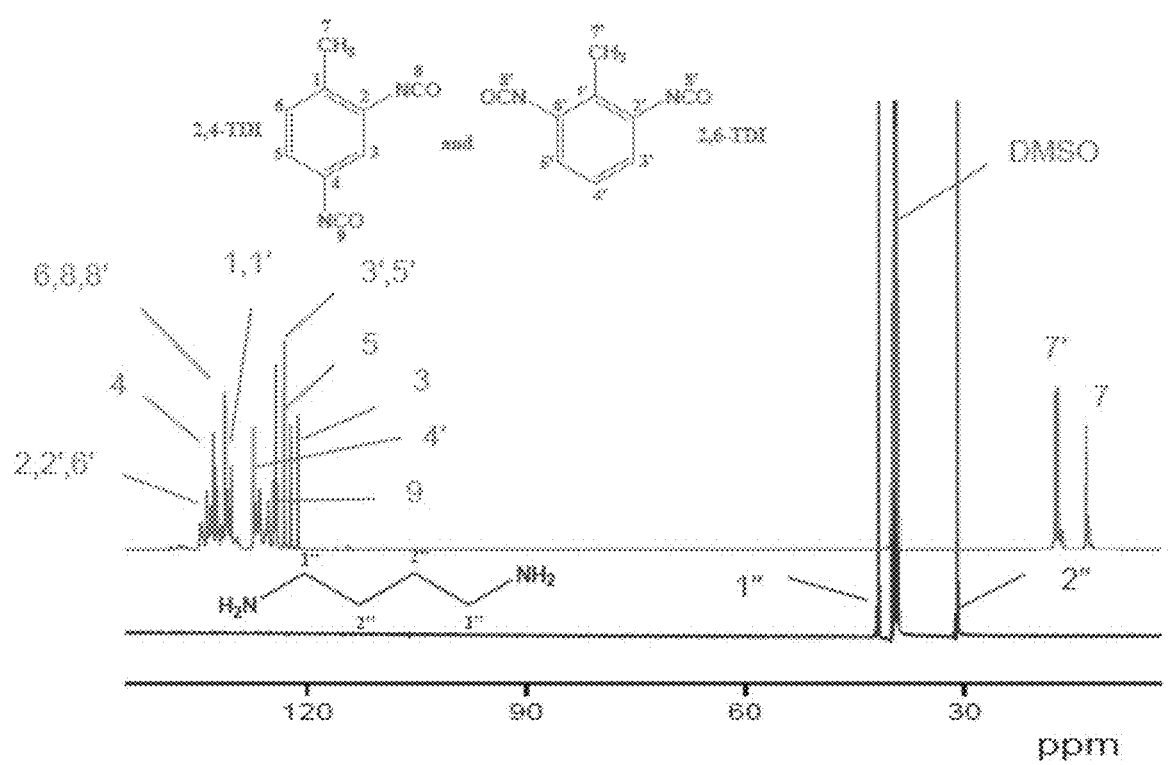
FIG. 2A is a $^{13}C$ NMR spectrum of a mixture of toluene 2,4-diisocyanate (2,4-TDI), toluene-2,6-diisocyanate (2,6-TDI), and 1,4-diaminobutane in deuterated DMSO (DMSO-$d_6$).
FIG. 2B is a $^{13}C$ NMR spectrum of polyurea in DMSO-$d_6$.
Figure 4A:
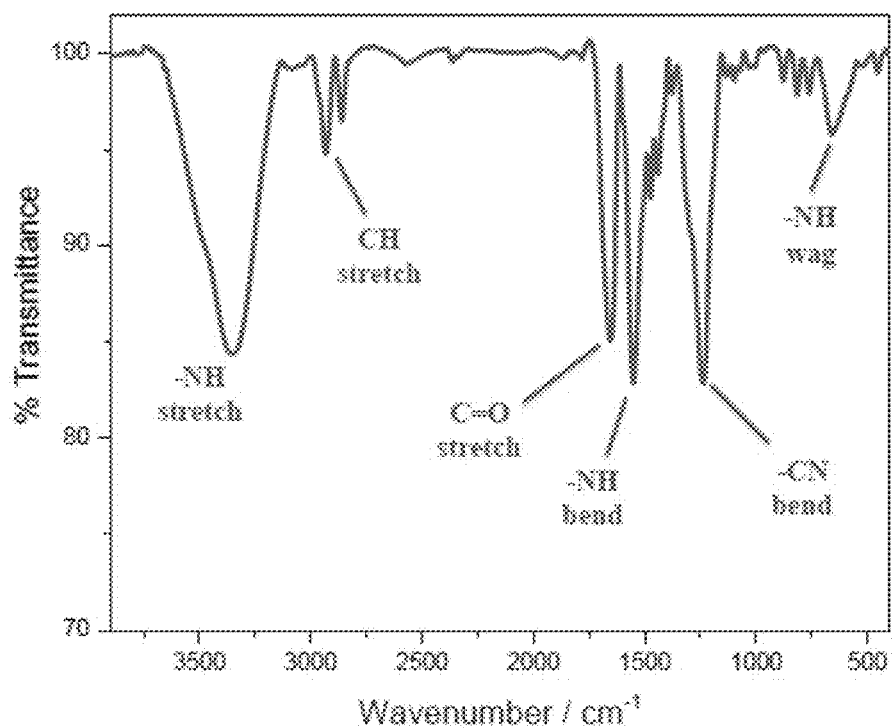
FIG. 4A is a FT-IR spectrum of polyurea.
Figure 4B:
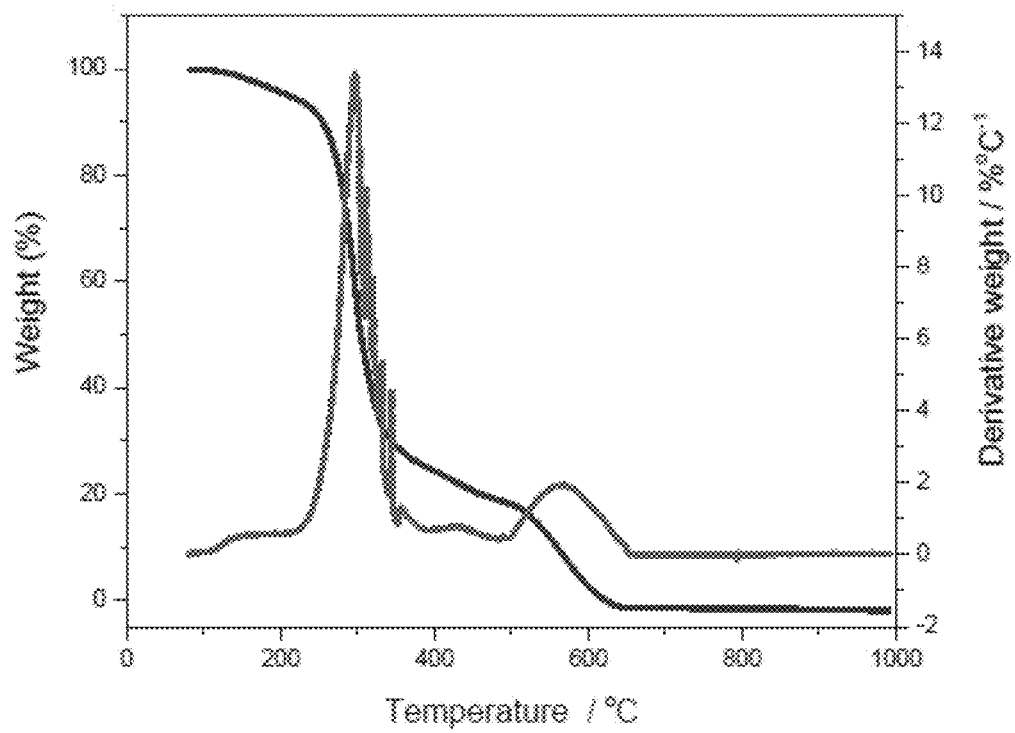
FIG. 4B is a thermal gravimetric analysis (TGA) curve of polyurea.

The $^{13}$C NMR spectra of both monomers and PU polymer are presented in FIGS. 2A and 2B. As shown in FIG. 2A, 1,4-diaminobutane has two resonance peaks in the $^{13}$C NMR which were both found with chemical shifts at 30.98 ppm and 41.76 ppm corresponding to the carbon atoms labeled as 1" and 2", respectively. TDI consists of two isomers (2,4- and 2,6-TDI), hence multiple resonance peaks were observed. Assignment of $^{13}$C NMR resonance peaks followed a reported procedure [H. Han, S. Li, X. Zhu, X. Jiang, X. Z. Kong, One step preparation of porous polyurea by reaction of toluene diisocyanate with water and its characterization, RSC Advances, 4 (2014) 33520-33529, incorporated herein by reference in its entirety] and peaks are labeled as shown in FIG. 2A. In the case of polyurea, it is important to note that resonance peaks were weak due to limited solubility of polyurea in DMSO. However, with increased number of scans and enlarged spectra (FIG. 2B), it can be seen that peaks assigned to carbon atoms attached to —NCO of TDI ($C_2$, $C_{2'}$, $C_4$ and $C_{6'}$) at 132.55 ppm and 132.83 ppm all disappeared in PU spectrum. Furthermore, peaks assigned to —NCO carbons ($C_8$, $C_9$ and $C_{8'}$) at 131.30 ppm and 124.20 ppm were also absent. New peaks appeared at around 155.27 ppm, which have been assigned to characteristic resonances of carbonyl linkage (C=O) in polyurea [H. Han, S. Li, X. Zhu, X. Jiang, X. Z. Kong, One step preparation of porous polyurea by reaction of toluene diisocyanate with water and its characterization, RSC Advances, 4 (2014) 33520-33529, incorporated herein by reference in its entirety]. This observation confirms the formation of polyurea from the reacted monomers.

Figure 3A:
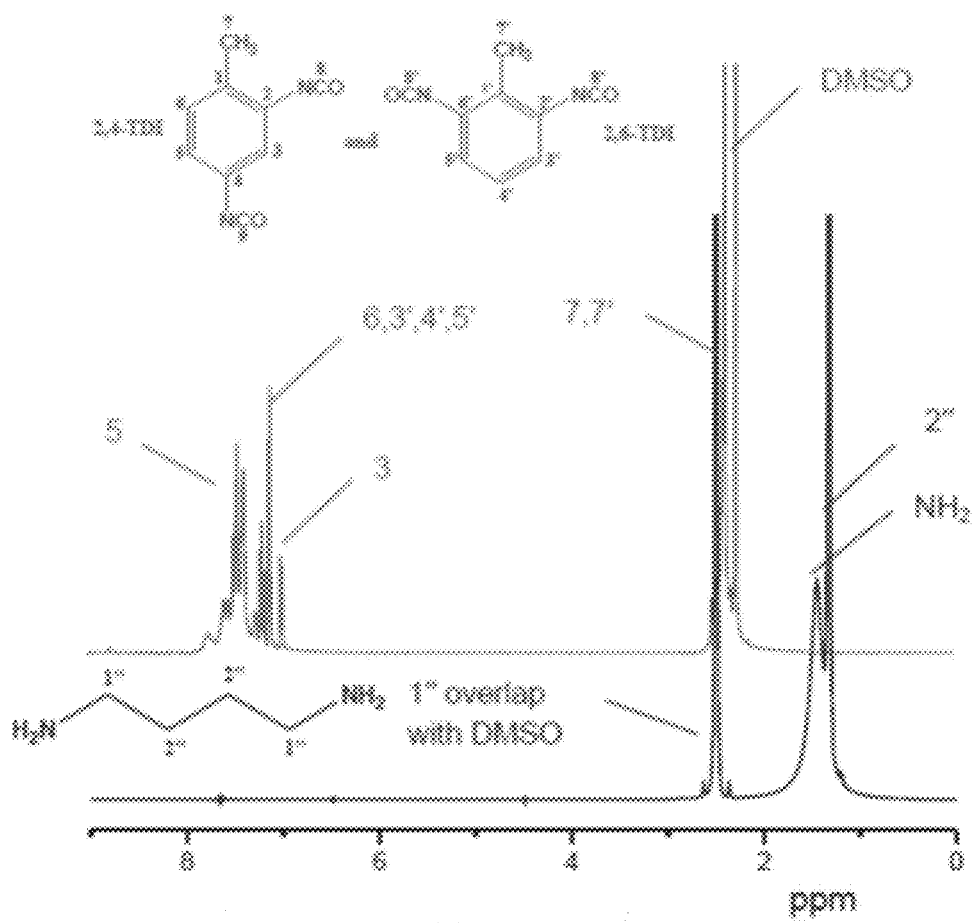
FIG. 3A is a $^1H$ NMR spectrum of a mixture of toluene 2,4-diisocyanate (2,4-TDI), toluene-2,6-diisocyanate (2,6-TDI), and 1,4-diaminobutane in DMSO-$d_6$.
Figure 3B:
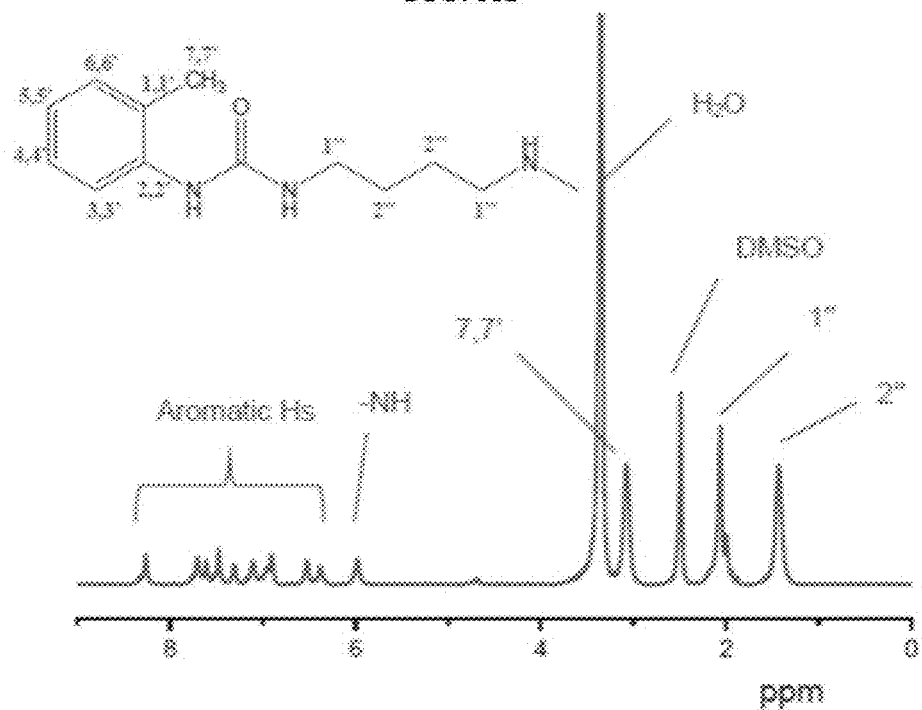
FIG. 3B is a $^1H$ NMR spectrum of polyurea in DMSO-$d_6$.

Monomers and polymer were further characterized by $^{1}$H NMR spectroscopy and the results are presented in FIGS. 3A and 3B. Notably from the $^{1}$H NMR spectrum of DAB (FIG. 3A), a broad peak was observed at chemical shift 1.45 ppm corresponding to the terminal amino hydrogen atoms. The broadening of the observed peak may be due to acidic nature of these protons that tend to exchange with one another. Likewise, two additional peaks were observed at 1.33 ppm and 2.49 ppm assigned to protons labeled as 2" and 1", respectively. The proton resonance at 2.49 ppm was not clearly visible as it overlapped with that of residual solvent (DMSO) signal at 2.50 ppm. In the case of TDI, resonance peaks of the methyl groups ($H_7$ and $H_{7'}$) appeared at 2.51 ppm and also overlapped with the solvent signal. Aromatic protons which appeared in the range of chemical shifts 6.0-8.0 ppm were also assigned as shown. For polyurea, however, multiple peaks appeared between chemical shifts 1.30 ppm and 4.0 ppm and have been assigned to protons in DAB (1" and 2"), DMSO signal, and methyl protons ($H_7$ and $H_{7'}$) on TDI and residual water present in DMSO as shown in FIG. 3B. Furthermore, resonance peak of protons in the urea (—NH) linkage appeared at 6.00 ppm, while those for aromatic protons gave a complicated splitting pattern in the range of 6.30-8.55 ppm as previously assigned [H. Han, S. Li, X. Zhu, X. Jiang, X. Z. Kong, One step preparation of porous polyurea by reaction of toluene diisocyanate with water and its characterization, RSC Advances, 4 (2014) 33520-33529, incorporated herein by reference in its entirety] due to the presence of two isomers of TDI. All these confirmed the formation of polyurea from the reacted monomers TDI and DAB in the present disclosure.

FT-IR spectrum of PU (FIG. 4A) shows the presence of C=O stretch of the urea linkage at 1650 cm$^{-1}$, and a substituted —NH stretch at 3350 cm$^{-1}$ [Y. Yang, X. Jiang, X. Zhu, X. Z. Kong, A facile pathway to polyurea nanofiber fabrication and polymer morphology control in copolymerization of oxydianiline and toluene diisocyanate in acetone, RSC Advances, 5 (2015) 7426-7432, incorporated herein by reference in its entirety]. The strong absorption band at 1550 cm$^{-1}$ represents the —NH bend while —CH stretch band appeared around 3000 cm$^{-1}$ [H. Han, S. Li, X. Zhu, X. Jiang, X. Z. Kong, One step preparation of porous polyurea by reaction of toluene diisocyanate with water and its characterization, RSC Advances, 4 (2014) 33520-33529, incorporated herein by reference in its entirety]. Others are the —NH wag, —CH and —CN stretch bands at 700 cm$^{-1}$, 2930 cm$^{-1}$ and 1230 cm$^{-1}$, respectively.

The TGA curve (FIG. 4B) shows 3 major losses in weight. The first slow weight loss of 15% is due to the loss of water embedded inside the polyurea at approx. 120° C. The second and third losses at approx. 300° C. and 550° C. are due to the combustion of nitrogenous organic fractions present in the polymer with the release of $CO_2$, NOx, and $H_2O$ gases [T. A. Saleh, S. A. Haladu, S. A. Ali, A novel cross-linked pH-responsive tetrapolymer: Synthesis, characterization and sorption evaluation towards Cr(III), Chemical Engineering Journal, 269 (2015) 9-19, incorporated herein by reference in its entirety].

Morphology of polyurea determined by scanning electron microscope (SEM) and elemental composition determined by EDX revealed a cluster of spherical microporous materials with micro-sized particle size comprising mainly of carbon, nitrogen and oxygen. X-ray diffraction spectrometry (XRD) was used to check the crystallinity of the polymer and the result revealed a broad peak characteristic of amorphous materials which confirms the formation of PU in the present disclosure.

Example 7

Results and Discussions: DFT

A major breakthrough of the present disclosure is the fact that polyurea which is generally known to be insoluble in an aqueous medium is being utilized as a corrosion inhibitor in mild steel corrosion. In one aspect this was done through solubilizing polyurea in N-methyl-2-pyrrolidone before dilution with the acid solution. In order to understand the role the solvent plays in the corrosion inhibitive performance of the polymer, electronic calculations were carried out on both molecules.

Figure 5A:
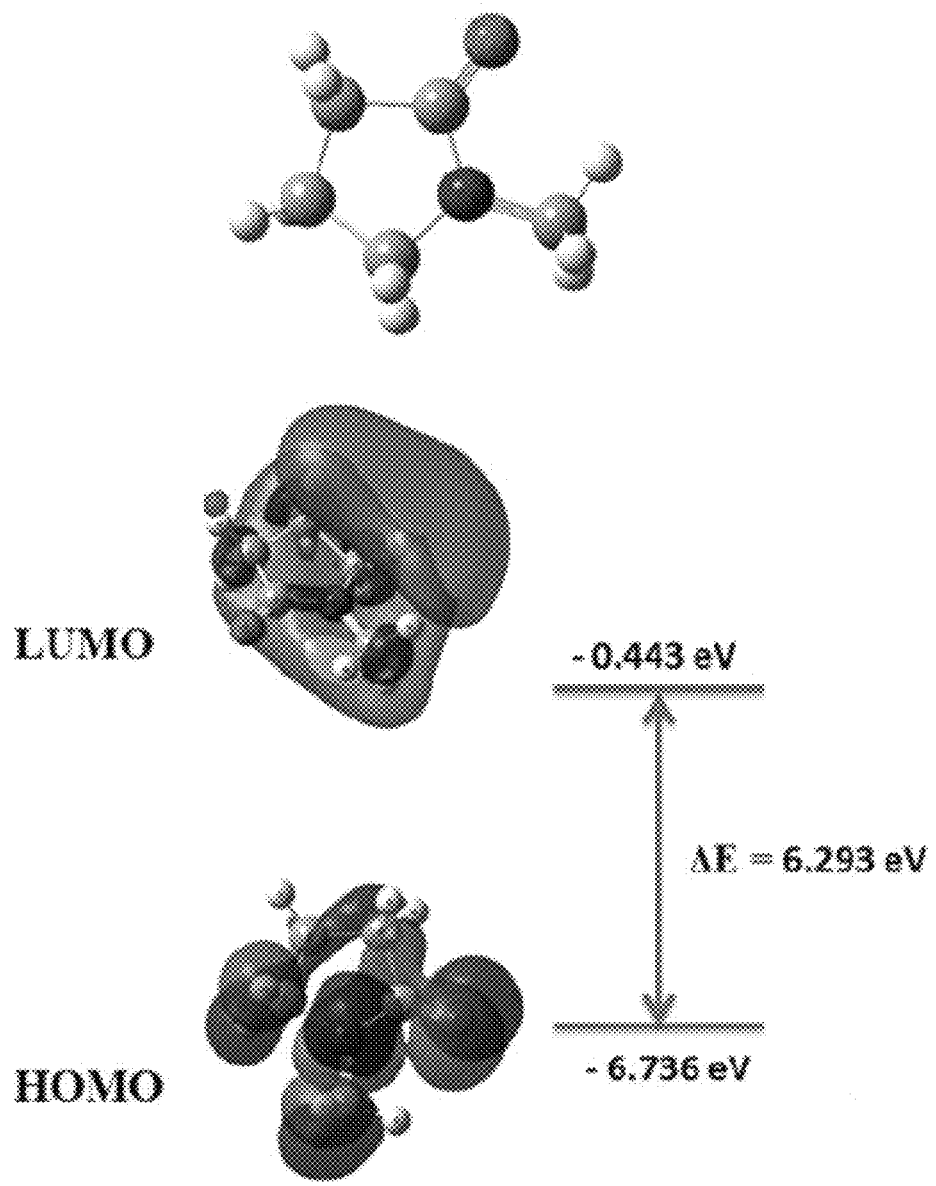
FIG. 5A shows a structural geometry and frontier orbitals of N-methyl-2-pyrrolidone.
Figure 5B:
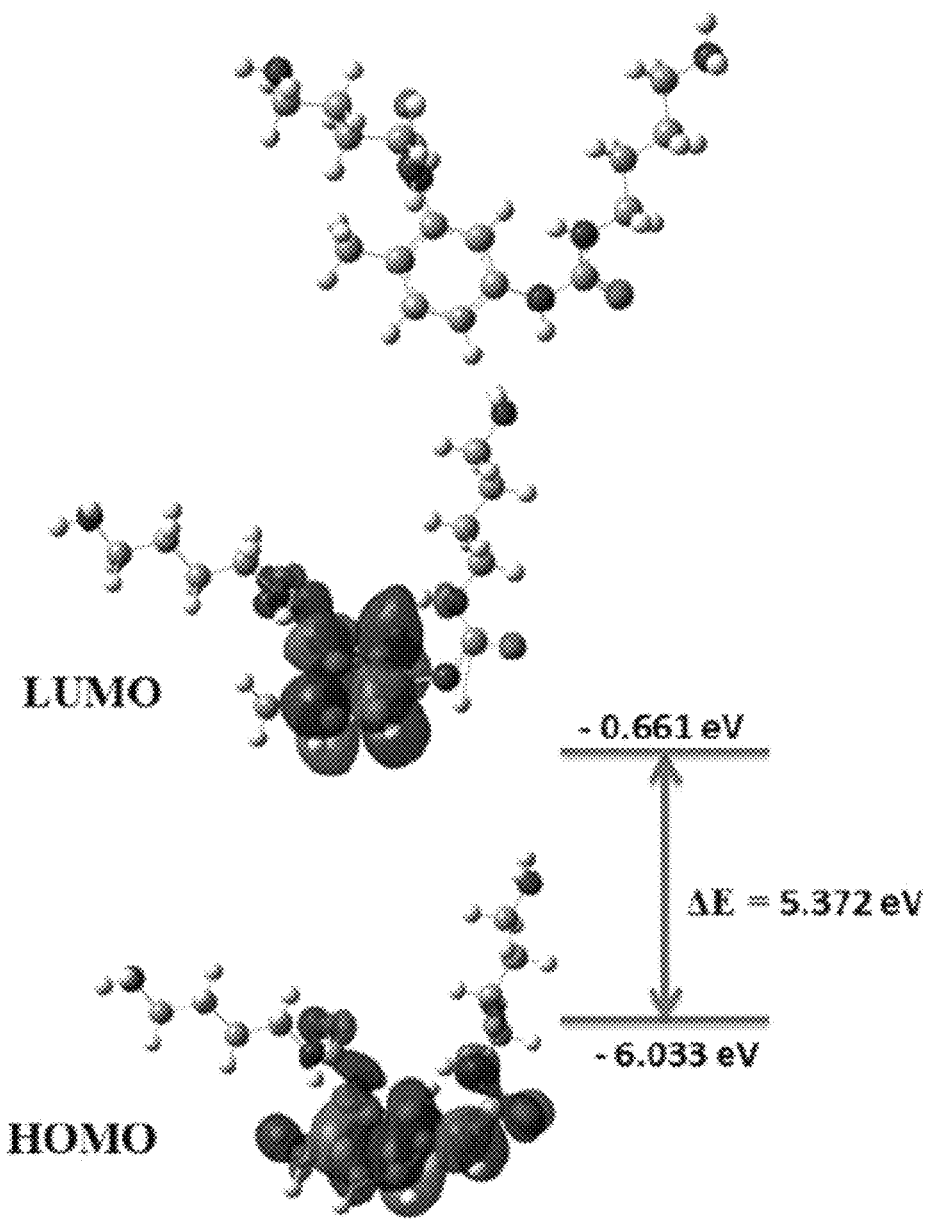
FIG. 5B shows a structural geometry and frontier orbitals of polyurea.

FIG. 5 shows the structural geometry and frontier molecular orbital distribution of the molecules. In all cases electron density of the highest occupied molecular orbital (HOMO) of the solvent and the polymer are localized mainly on the nitrogen and oxygen atoms present in both molecules and on the aromatic ring of the polymer. This indicates the feasibility of bonding of the molecules to the vacant d-orbital of the metal. However, in the case of the solvent, resonation of the non-bonding electrons between nitrogen and oxygen atoms makes the electrons unavailable for bonding most of the time. Accordingly, the role played by the solvent in the adsorption of the polymer is quite insignificant. Furthermore, energy gap between the HOMO and LUMO orbitals ($\Delta E$) indicates that the polymer having a lower energy gap is predicted to be more reactive compared to the solvent.

Global hardness ($\eta$) is another feature which indicates the chemical reactivity of a molecule. It indicates the resistance of a molecule to electron density change. According to the hard-soft acid base theory (HSAB) [A. Kokalj, On the HSAB based estimate of charge transfer between adsorbates and metal surfaces, Chemical Physics, 393 (2012) 1-12], molecules with larger $\eta$ are less reactive compared to molecules with smaller $\eta$ which are more polarizable and more prone to acquire electronic charge. Results from electronic calculations are given in Table 1 which clearly shows that the role played by the solvent in the present study is simply that of a dispersion medium and makes little or no contribution to the observed inhibitive performance of the polymer.

TABLE 1

Electronic property of molecules

| Molecule | $E_{HOMO}$ (eV) | $E_{LUMO}$ (eV) | $\Delta E_{L\text{-}H}$ (eV) | $\eta$ (eV) |
|---|---|---|---|---|
| N-methyl-2-pyrrolidone | −6.736 | −0.443 | 6.293 | 3.147 |
| PU | −6.033 | −0.661 | 5.372 | 2.686 |

Example 8

Electrochemistry Results: Open Circuit Vs Time Measurement

Open circuit potential (OCP) is the potential measured when no external current is passed through the metal in the corrosive medium. It is a thermodynamic parameter that indicates the tendency of a metal to undergo electrochemical corrosion. When immersed in the electrolyte the metal begins to corrode naturally without an application of current until it reaches a stationary state. At this point open circuit potential (Eocp) is equal to the corrosion potential (Ecorr). Hence a potential below Eocp is said to be thermodynamically stable and a metal having such potential is more susceptible to undergo corrosion. OCP measurements generally provide information whether the metal under study is in the active or passive state and serves as a starting point for the application of electrochemical methods of corrosion measurement [S. Choudhary, A. Garg, K. Mondal, Relation Between Open Circuit Potential and Polarization Resistance with Rust and Corrosion Monitoring of Mild Steel, Journal of Materials Engineering and Performance, 25 (2016) 2969-2976; S. Saker, N. Aliouane, H. Hammache, S. Chafaa, G. Bouet, Tetraphosphonic acid as eco-friendly corrosion inhibitor on carbon steel in 3% NaCl aqueous solution, Ionics, 21 (2015) 2079-2090; and I. Felhősi, J. Telegdi, G. Pálinkás, E. Kálmán, Kinetics of self-assembled layer formation on iron, Electrochimica Acta, 47 (2002) 2335-2340].

Figure 6:
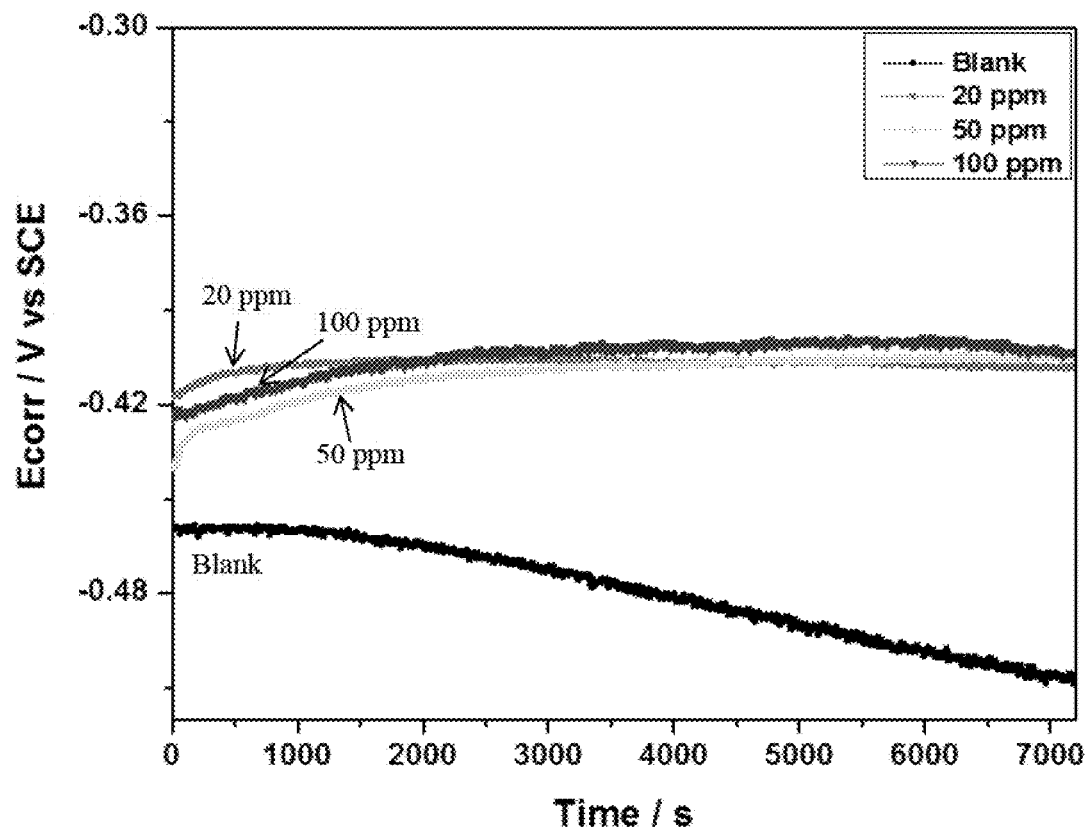
FIG. 6 is an overlay of open circuit vs time curves of mild steel at 25° C. (298 K) in 1.0 M HCl aqueous solution in the absence (blank) or presence of polyurea at 20, 50, and 100 ppm, respectively.
Figure 7A:
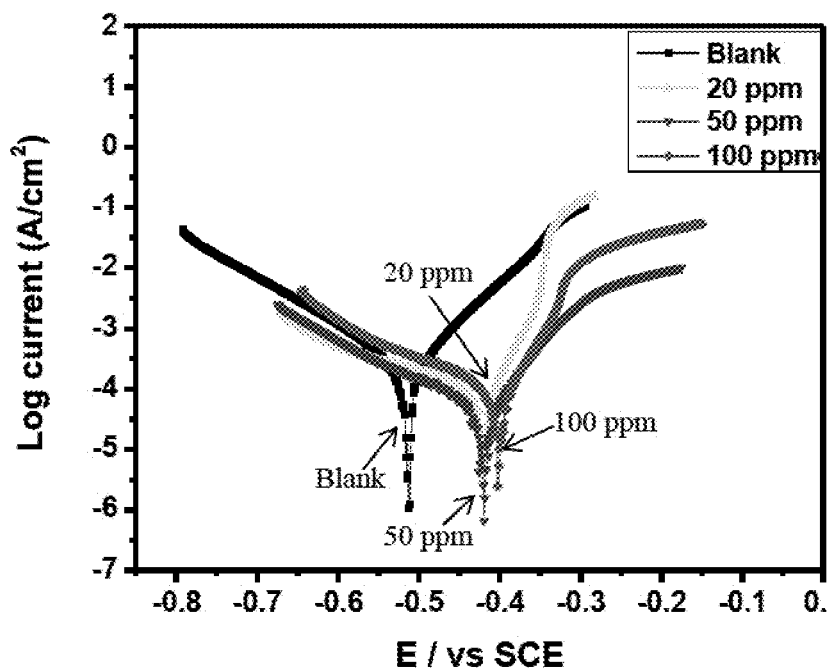
FIG. 7A is an overlay of Tafel polarization curves of mild steel at 25° C. (298 K) in 1.0 M HCl aqueous solution in the absence (blank) or presence of polyurea at 20, 50, and 100 ppm, respectively.
Figure 7B:
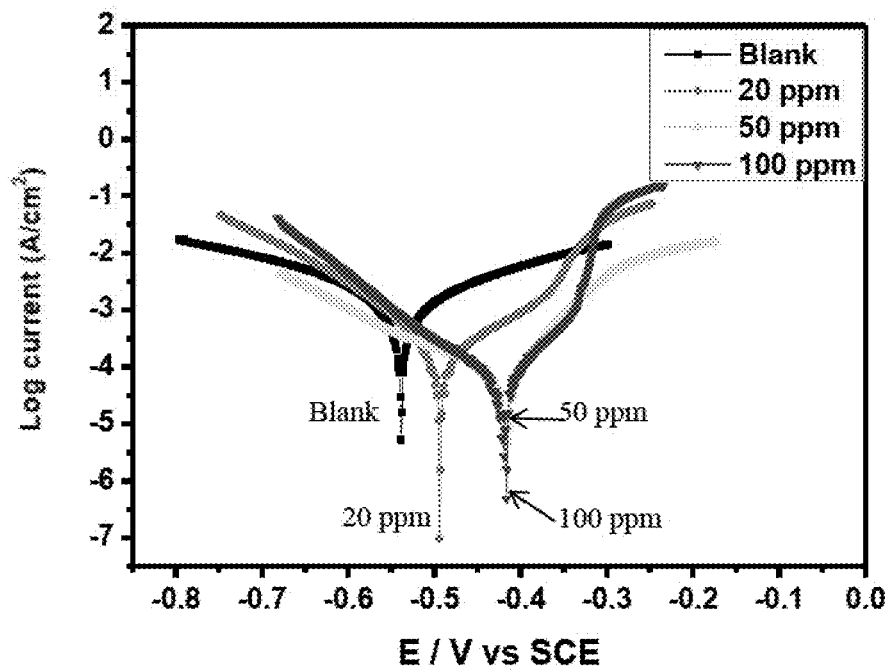
FIG. 7B is an overlay of Tafel polarization curves of mild steel at 30° C. (303 K) in 1.0 M HCl aqueous solution in the absence (blank) or presence of polyurea at 20, 50, and 100 ppm, respectively.
Figure 7C:
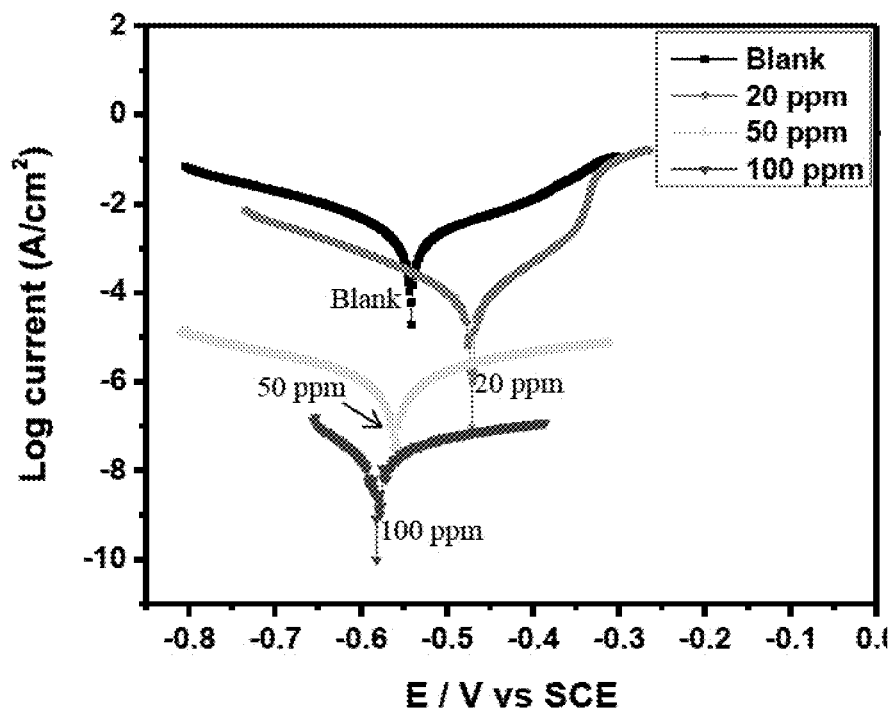
FIG. 7C is an overlay of Tafel polarization curves of mild steel at 35° C. (308 K) in 1.0 M HCl aqueous solution in the absence (blank) or presence of polyurea at 20, 50, and 100 ppm, respectively.
Figure 7D:
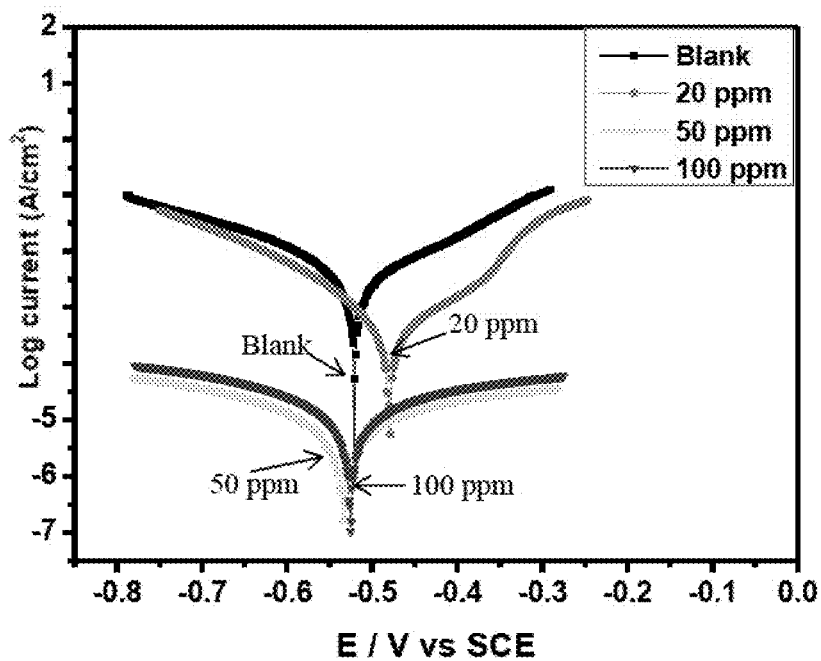
FIG. 7D is an overlay of Tafel polarization curves of mild steel at 40° C. (313 K) in 1.0 M HCl aqueous solution in the absence (blank) or presence of polyurea at 20, 50, and 100 ppm, respectively.
Figure 7E:
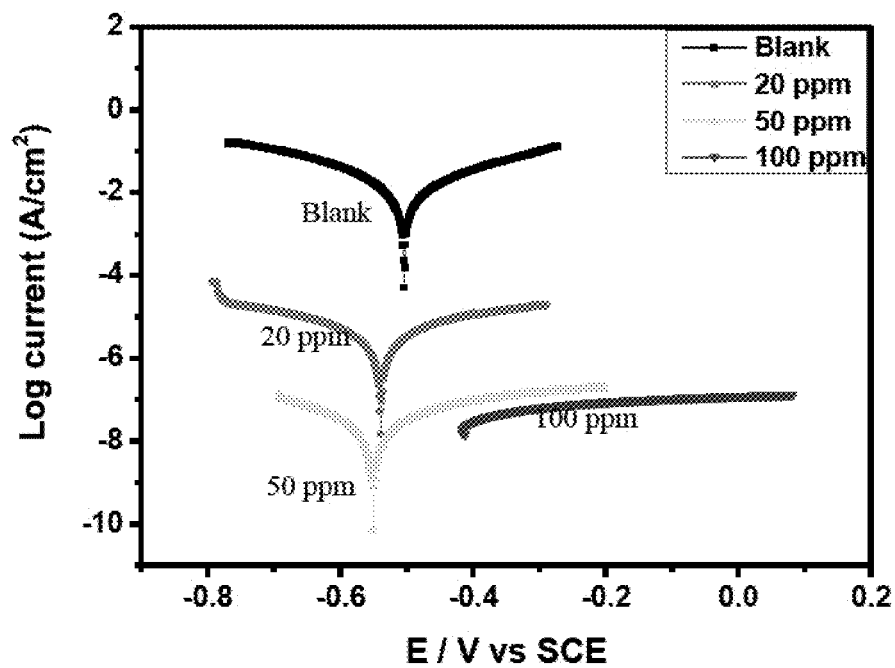
FIG. 7E is an overlay of Tafel polarization curves of mild steel at 50° C. (323 K) in 1.0 M HCl aqueous solution in the absence (blank) or presence of polyurea at 20, 50, and 100 ppm, respectively.
Figure 8A:
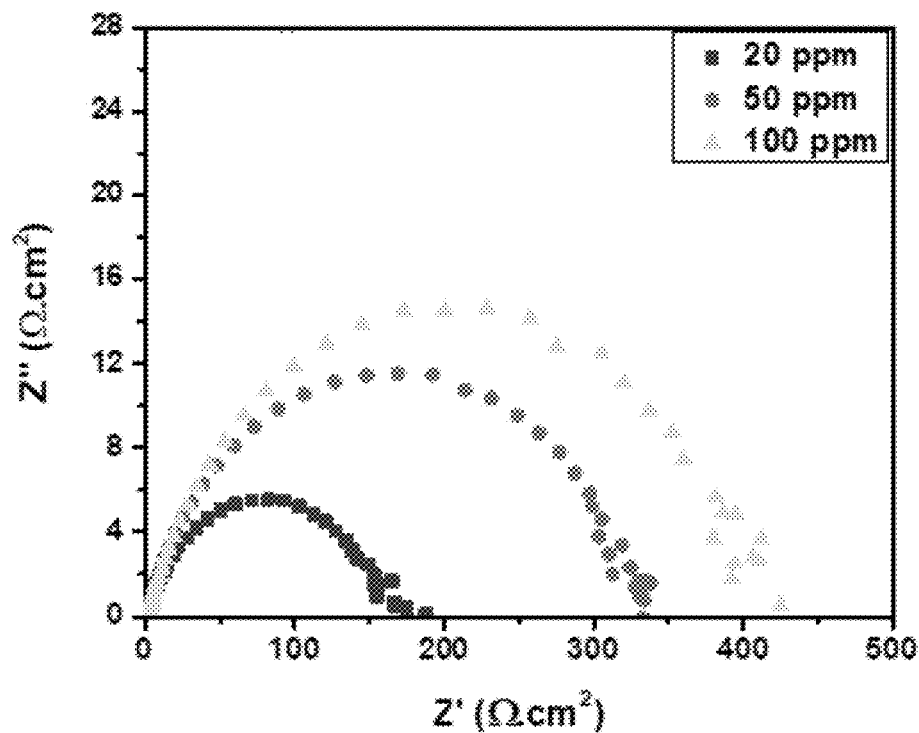
FIG. 8A is an overlay of Nyquist plots of mild steel at 25° C. (298 K) in 1.0 M HCl aqueous solution in the presence of polyurea at 20, 50, and 100 ppm, respectively.
Figure 8B:
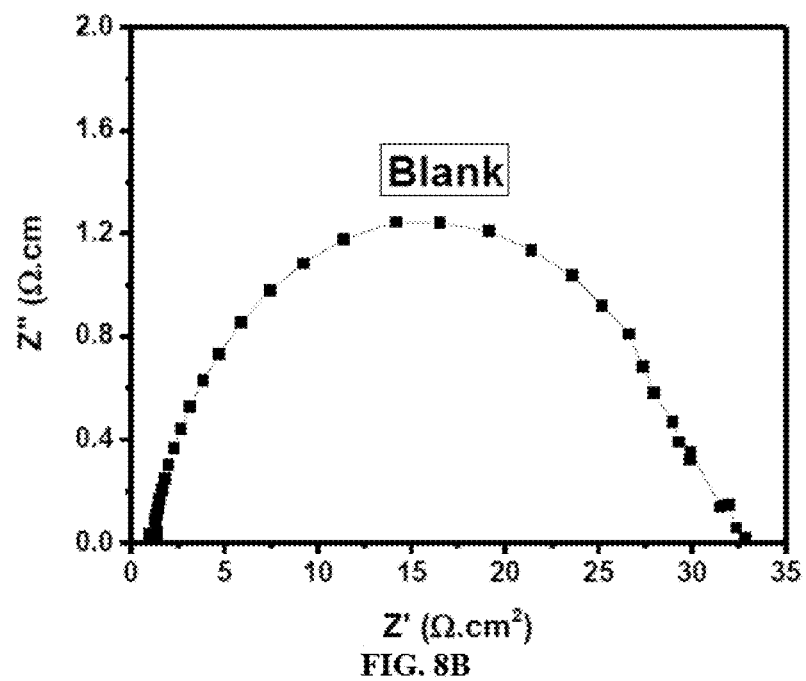
FIG. 8B is a Nyquist plot of mild steel at 25° C. (298 K) in 1.0 M HCl aqueous solution in the absence of polyurea (blank).
Figure 8C:
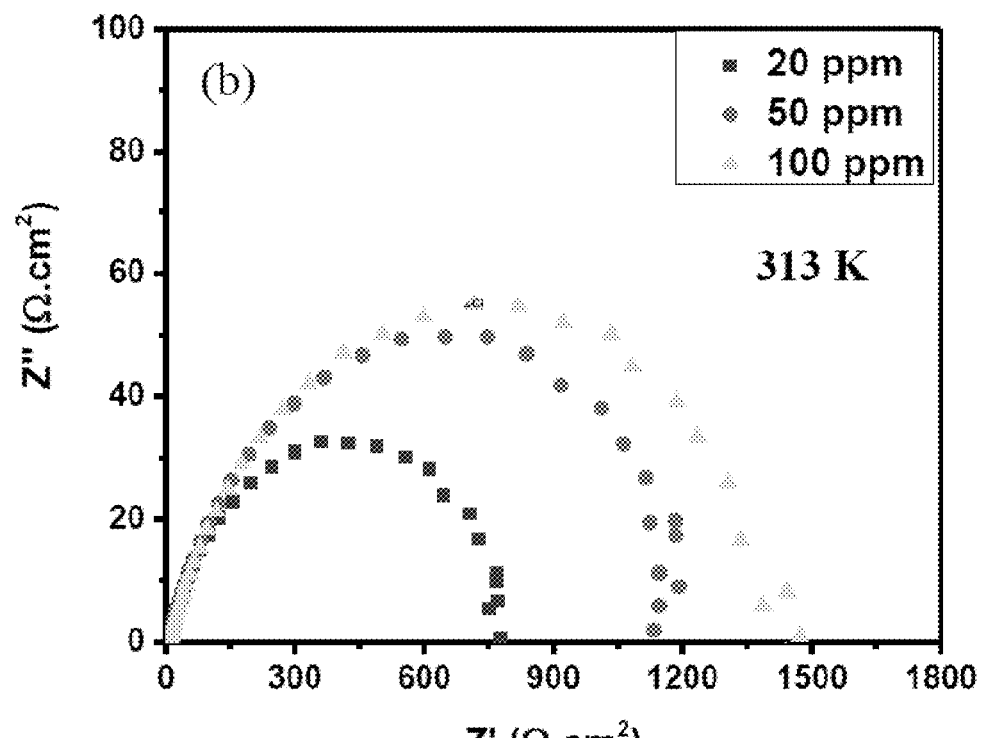
FIG. 8C is an overlay of Nyquist plots of mild steel at 40° C. (313 K) in 1.0 M HCl aqueous solution in the presence of polyurea at 20, 50, and 100 ppm, respectively.
Figure 8D:
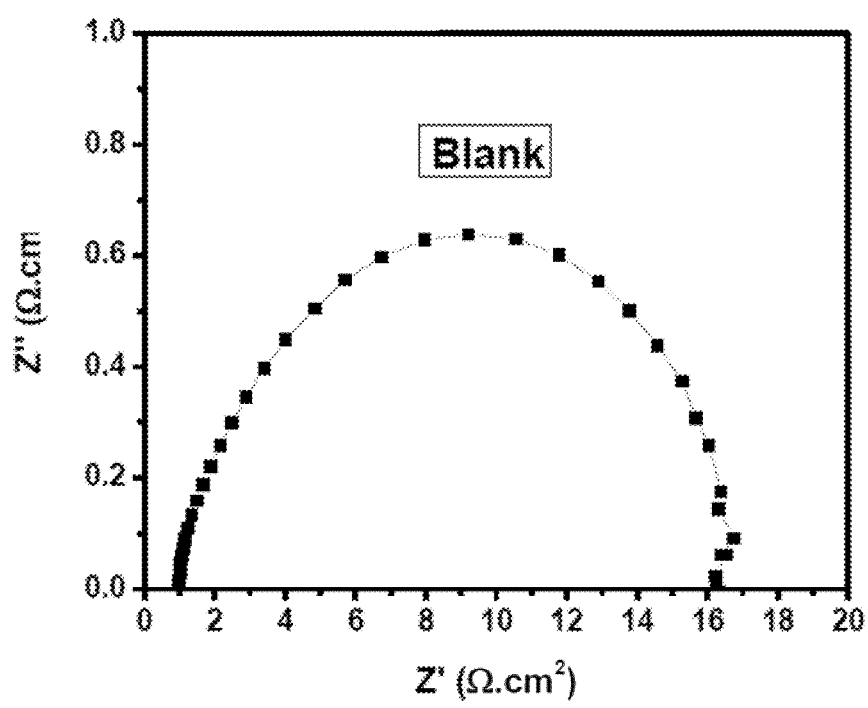
FIG. 8D is a Nyquist plot of mild steel at 40° C. (313 K) in 1.0 M HCl aqueous solution in the absence of polyurea (blank).
Figure 8E:
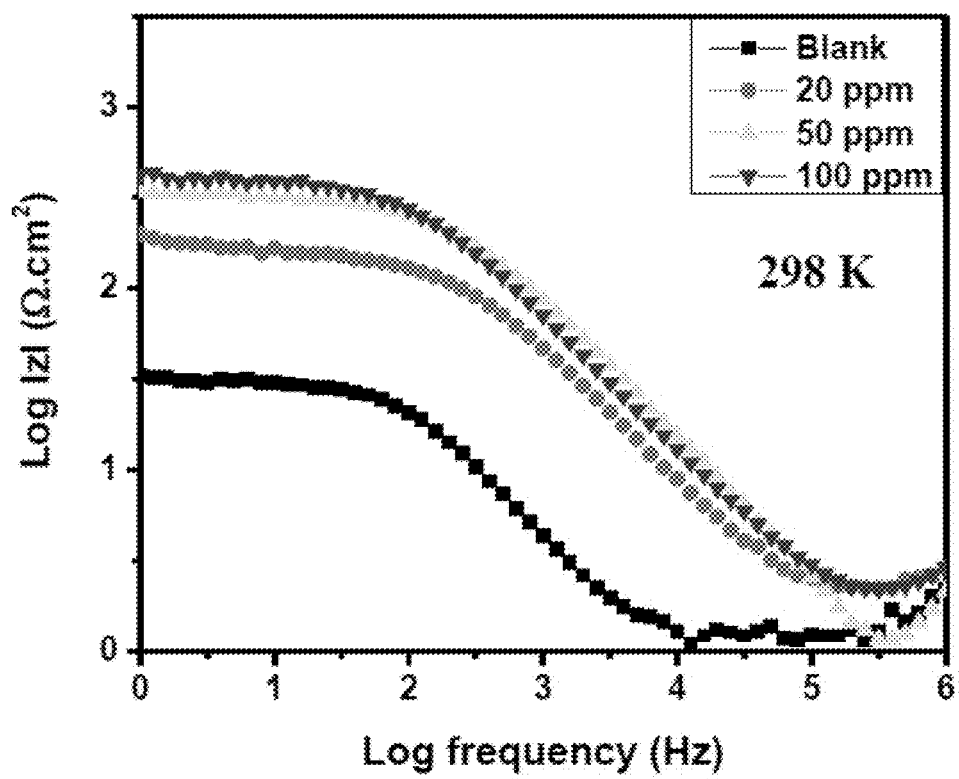
FIG. 8E is an overlay of Bode plots of mild steel at 25° C. (298 K) in 1.0 M HCl aqueous solution in the absence (blank) or presence of polyurea at 20, 50, and 100 ppm, respectively.
Figure 8F:
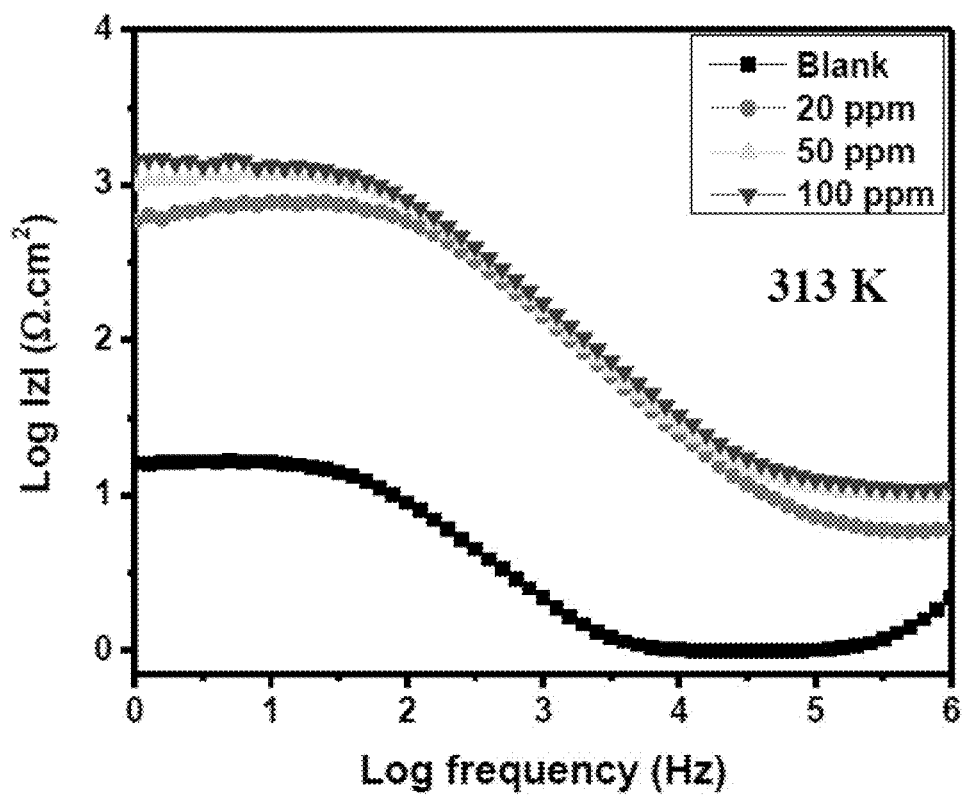
FIG. 8F is an overlay of Bode plots of mild steel at 40° C. (313 K) in 1.0 M HCl aqueous solution in the absence (blank) or presence of polyurea at 20, 50, and 100 ppm, respectively.
Figure 9:
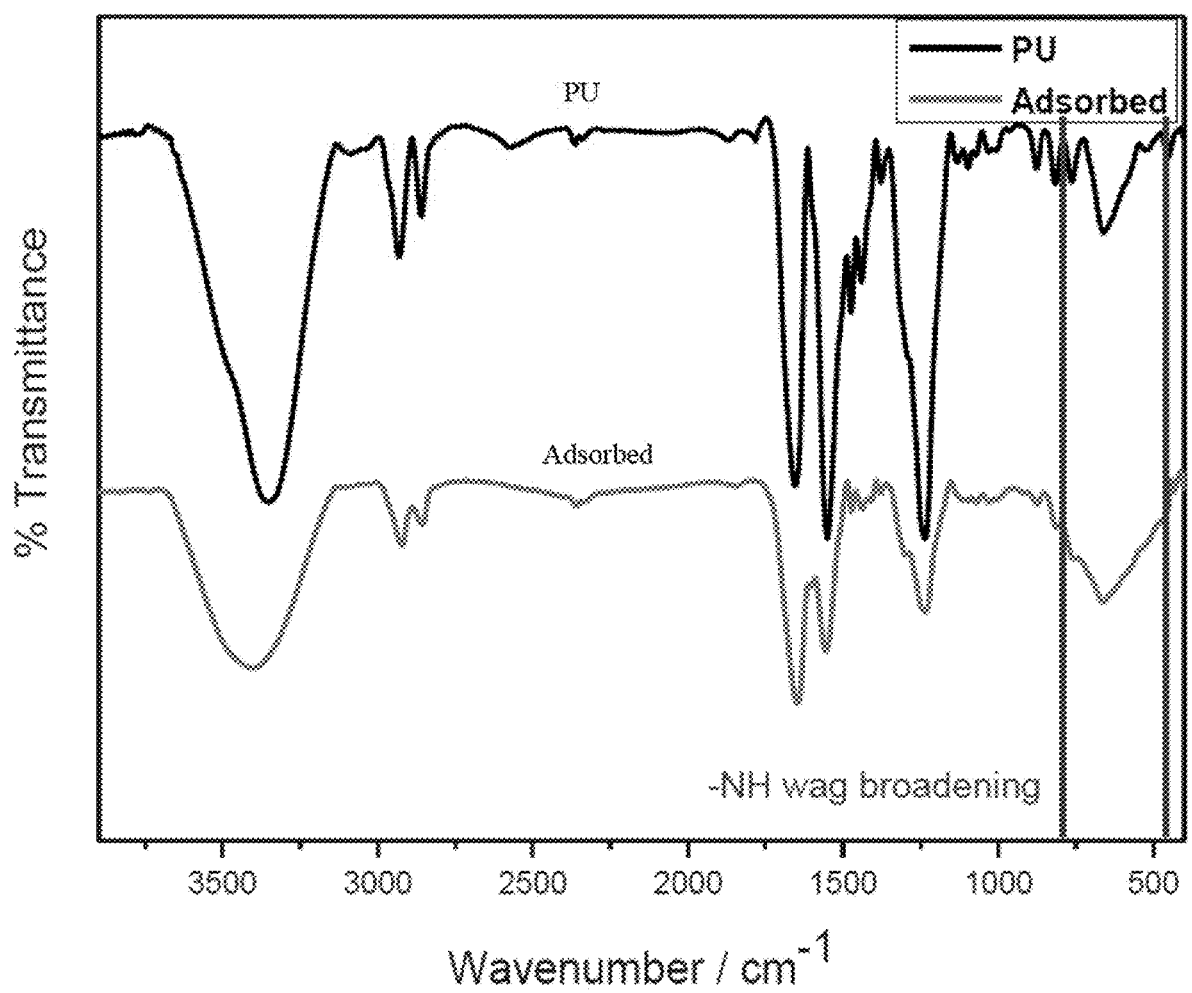
FIG. 9 is an overlay of FT-IR spectra of polyurea and adsorbed polyurea on mild steel after introducing polyurea according to the present method.

The Eocp curves of mild steel in 1.0 M HCl in the presence and absence of varying concentrations of PU (20, 50 and 100 ppm) are shown in FIG. 6. As shown in the Figure, a steady state was reached nearly after 300 s of immersion in the presence of the inhibitor molecules while in its absence the metal continues to corrode even after 7200 s. The blank in this case refers to a solution containing 1.0 M HCl and N-methyl-2-pyrrolidone which is used as a solvent for dissolving the polymer in the ratio 100:1. This confirms the findings from DFT calculations and shows that the presence of the solvent plays little or no role in the inhibitive performance observed of the polymer. Furthermore, the Eocp of the inhibitor molecules shifts to more noble values with increasing concentration which indicates an increase in surface coverage on the metal consequently leading to a decrease in corrosion rate.

Example 9

Electrochemistry Results: Potentiodynamic Polarization Measurements

Potentiodynamic polarization (Tafel) measurements provide information on the kinetics of partial anodic and cathodic reactions. In this technique, the potential of the working electrode (metal) is scanned in the positive (anodic) and negative (cathodic) directions and information such as corrosion rate, pitting susceptibility and passivity of the metal can be extracted from the resulting Tafel curve. In order to fully understand the mechanism of inhibition of mild steel corrosion by polyurea in the present study, it is important to highlight the mechanism through which corrosion of iron takes place.

First, upon contact with the corrosive medium (HCl in this case), Fe undergoes oxidation to form $Fe^{2+}$ as follows [A. Zeino, I. Abdulazeez, M. Khaled, M. W. Jawich, I. B. Obot, Mechanistic study of polyaspartic acid (PASP) as eco-friendly corrosion inhibitor on mild steel in 3% NaCl aerated solution, Journal of Molecular Liquids, 250 (2018) 50-62]

$$Fe \longrightarrow Fe^{2+} + 2e^- \qquad (1)$$

The $Fe^{2+}$ generated in the process combines with the chloride ions in the medium and later with water molecules and oxygen atoms in a series of reactions as follows;

$$Fe^{2+} + 2Cl^- \longrightarrow FeCl_2 \qquad (2)$$

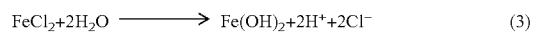
$$FeCl_2 + 2H_2O \longrightarrow Fe(OH)_2 + 2H^+ + 2Cl^- \qquad (3)$$

$$Fe^{2+} + O_2 \longrightarrow Fe^{3+} + e^- \qquad (4)$$

The cathodic reaction which completes the electrochemical process is represented as follows;

$$O_2 + 2H_2O + 4e^- \longrightarrow 4OH^- \qquad (5)$$

From the combined anodic and cathodic reactions, precipitates of $Fe(OH)_2$ are formed which gradually accumulate on the metal surface and further react with dissolved oxygen giving complex corrosion products [S. Saker, N. Aliouane, H. Hammache, S. Chafaa, G. Bouet, Tetraphosphonic acid as eco-friendly corrosion inhibitor on carbon steel in 3% NaCl aqueous solution, Ionics, 21 (2015) 2079-2090, incorporated herein by reference in its entirety].

Organic inhibitors are believed to adsorb on iron by first displacing water molecules on the metal surface followed by combination with $Fe^{2+}$ generated on the surface to form Fe-inhibitor complex [H. Ashassi-Sorkhabi, E. Asghari, Effect of hydrodynamic conditions on the inhibition performance of 1-methionine as a "green" inhibitor, Electrochimica Acta, 54 (2008) 162-167, incorporated herein by reference in its entirety] as follows;

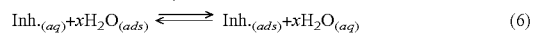
$$Inh._{(aq)} + xH_2O_{(ads)} \rightleftharpoons Inh._{(ads)} + xH_2O_{(aq)} \qquad (6)$$

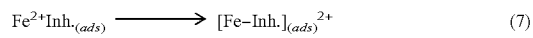
$$Fe^{2+}Inh._{(ads)} \longrightarrow [Fe\text{-}Inh.]_{(ads)}^{2+} \qquad (7)$$

The complex formed either prevents more water molecules from reaching the metal (inhibitor) or enhances the permeation of water molecules (accelerator). If the concentration is high enough up to the critical mass of the inhibitor a complete coverage of the metal's surface is achieved preventing the diffusion of oxygen atoms to complete the cathodic half reaction, forcing the metal into passivation. On the basis of these, inhibitors are classified as either anodic, cathodic or mixed-type corrosion inhibitors [H. Ju, Z.-P. Kai, Y. Li, Aminic nitrogen-bearing polydentate Schiff base compounds as corrosion inhibitors for iron in acidic media: A quantum chemical calculation, Corrosion Science, 50 (2008) 865-871].

Potentiodynamic polarization measurement curves carried out on mild steel at various temperatures and inhibitor concentrations are presented in FIGS. 7A-7E. The corresponding Tafel extrapolated data are listed in Table 2.

TABLE 2

Tafel polarization data of mild steel at varying temperatures and concentrations

| Temperature (K) | Medium | Inhibitor Conc. (ppm) | $E_{corr}$/ V vs SCE | $I_{corr}$ ($\mu A \cdot cm^{-2}$) | Corrosion rate (mmpy) | θ | η % |
|---|---|---|---|---|---|---|---|
| 298 | Blank | 0 | −0.512 | 301.1 | 3.43 | — | — |
|  | PU | 20 | −0.420 | 87.0 | 1.02 | 0.703 | 70.3 |
|  |  | 50 | −0.420 | 15.2 | 0.18 | 0.948 | 94.8 |
|  |  | 100 | −0.402 | 5.0 | 0.06 | 0.983 | 98.3 |
| 303 | Blank | 0 | −0.539 | 470.2 | 5.46 | — | — |
|  | PU | 20 | −0.494 | 28.1 | 0.33 | 0.939 | 94.0 |
|  |  | 50 | −0.417 | 17.0 | 0.20 | 0.963 | 96.3 |
|  |  | 100 | −0.416 | 1.2 | 0.02 | 0.996 | 99.6 |
| 308 | Blank | 0 | −0.542 | 3070.3 | 35.56 | — | — |
|  | PU | 20 | −0.471 | 2.0 | 0.02 | 0.999 | 100 |
|  |  | 50 | −0.561 | 0.1 | 0.01 | 0.999 | 100 |
|  |  | 100 | −0.582 | 0.1 | 0.01 | 0.999 | 100 |
| 313 | Blank | 0 | −0.521 | 4400.5 | 51.08 | — | — |
|  | PU | 20 | −0.479 | 31.3 | 0.36 | 0.994 | 99.4 |
|  |  | 50 | −0.534 | 11.1 | 0.13 | 0.998 | 99.8 |
|  |  | 100 | −0.526 | 3.6 | 0.03 | 0.999 | 100 |
| 323 | Blank | 0 | −0.504 | 8430.2 | 96.5 | — | — |
|  | PU | 20 | −0.539 | 2.2 | 0.02 | 0.999 | 100 |
|  |  | 50 | −0.551 | 0.3 | 0.01 | 0.999 | 100 |
|  |  | 100 | Passivation | — | — | — | — |

Corrosion inhibition efficiency was calculated using the equation:

$$\eta(\%) = \left(\frac{i^\circ_{corr} - i_{corr}}{i^\circ_{corr}}\right) \times 100 \qquad (8)$$

where $i^\circ_{corr}$ and $i_{corr}$ are corrosion current density values in the absence and presence of the inhibitors respectively [E. Gutiérrez, J. A. Rodríguez, J. Cruz-Borbolla, J. G. Alvarado-Rodríguez, P. Thangarasu, Development of a predictive model for corrosion inhibition of carbon steel by imidazole and benzimidazole derivatives, Corrosion Science, 108 (2016) 23-35, incorporated herein by reference in its entirety].

The results showed that addition of the inhibitor significantly decreases the corrosion current ($i_{corr}$) which agrees with the results of the open circuit vs time measurement. Corrosion current continuously decreases upon increasing the concentration of the inhibitor due to an increase in surface coverage of the inhibitor on the metal surface. The corrosion potential ($E_{corr}$) on the other hand is observed to have mixed behaviors, where it shifts to positive in some cases and negative in others, an attribute of mixed-type corrosion inhibitors. As the temperature increases, the corrosion rate in the blank solution increases while the efficiency of the inhibited medium also increases, and the result at 50° C. and 100 ppm inhibitor concentration suggests a passivation control corrosion mechanism. This is because at higher concentrations and temperature, there is less dissolved oxygen in the medium and the inhibitor spreads out to achieve maximum surface coverage shifting the Ecorr into the passivation region as was later confirmed by spectroscopic studies. Overall, a 100% corrosion inhibition with a corrosion current less than 1 μA was achieved at 50 ppm and 50° C. making polyurea synthesized in the present disclosure an excellent inhibitor of mild steel corrosion in aqueous environment [B. D. B. Tiu, R. C. Advincula, Polymeric corrosion inhibitors for the oil and gas industry: Design principles and mechanism, Reactive and Functional Polymers, 95 (2015) 25-45; S. Kumar, H. Vashisht, L. O. Olasunkanmi, I. Bahadur, H. Verma, G. Singh, I. B. Obot, E. E. Ebenso, Experimental and theoretical studies on inhibition of mild steel corrosion by some synthesized polyurethane tri-block co-polymers, Scientific Reports, 6 (2016) 30937; and M. Goyal, S. Kumar, I. Bahadur, C. Verma, E. E. Ebenso, Organic corrosion inhibitors for industrial cleaning of ferrous and non-ferrous metals in acidic solutions: A review, Journal of Molecular Liquids, 256 (2018) 565-573, each incorporated herein by reference in their entirety].

Example 10

Electrochemistry Results: Electrochemical Impedance Spectroscopy Measurements

EIS measurements were carried out to understand the kinetics and characteristics of the electrochemical processes occurring at the steel/solution interface in the presence of the inhibitor molecule. FIGS. 8A-8F show resulting Nyquist (a and b) and Bode (c and d) plots of mild steel corrosion in 1.0 M HCl in the absence and presence of 20-100 ppm inhibitor at 25° C. and 40° C. Nyquist plots (FIGS. 8A, 8B, 8C, and 8D) are characterized by single depressed semi-circles which indicate that dominating process in the studied medium is the charge transfer reaction occurring at the metal/solution interface [C. Verma, L. O. Olasunkanmi, E. E. Ebenso, M. A. Quraishi, I. B. Obot, Adsorption Behavior of Glucosamine-Based, Pyrimidine-Fused Heterocycles as Green Corrosion Inhibitors for Mild Steel: Experimental and Theoretical Studies, The Journal of Physical Chemistry C, 120 (2016) 11598-11611, incorporated herein by reference in its entirety]. In addition, a single capacitive loop was present which implies that the studied inhibitor acts primarily as interface inhibitor through surface coverage mechanism [R. Solmaz, Investigation of corrosion inhibition mechanism and stability of Vitamin B1 on mild steel in 0.5M HCl solution, Corrosion Science, 81 (2014) 75-84, incorporated herein by reference in its entirety]. Diameter of the semi-circle also increases with increasing inhibitor concentration due to the increase in surface coverage by the inhibitor molecules. Bode plots (FIGS. 8E and 8F) also show the effect of the presence of the inhibitor molecules at the lower frequency modulus as the low frequency impedance increases with increasing inhibitor concentration. This is due to the adsorption of inhibitor molecules onto exposed steel surface thereby blocking the active corrosion sites [Z. Cao, Y. Tang, H. Cang, J. Xu, G. Lu, W. Jing, Novel benzimidazole derivatives as corrosion inhibitors of mild steel in the acidic media. Part II: Theoretical studies, Corrosion Science, 83 (2014) 292-298, incorporated herein by reference in its entirety].

Inhibition efficiency of the inhibitor molecules were calculated using the equation:

$$\eta(\%) = \left(\frac{R_{ct} - R_{ct}^\circ}{R_{ct}}\right) \times 100 \tag{9}$$

where $R_{ct}$ and $R^\circ_{ct}$ are the charge transfer resistances in the presence and absence of the inhibitor molecules, respectively [E. Gutiérrez, J. A. Rodriguez, J. Cruz-Borbolla, J. G. Alvarado-Rodríguez, P. Thangarasu, Development of a predictive model for corrosion inhibition of carbon steel by imidazole and benzimidazole derivatives, Corrosion Science, 108 (2016) 23-35].

Equivalent circuit model used for fitting and obtaining EIS data comprises of a constant phase element, CPE in parallel with a charge transfer resistance, Rct both of which are in series connection with the electrolyte resistance, Rs. Impedance of the constant phase element, $Z_{CPE}$ is given as:

$$Z_{CPE} = Y_O^{-1}(i\omega)^{-n} \tag{10}$$

where Yo represents CPE constant, $i^2$ an imaginary number (−1), ω angular frequency (rad s$^{-1}$) and n is CPE exponent. Values of n characterizes CPE, where n=0 implies that CPE=resistance; n=1, CPE=capacitance; n=−1, CPE=inductance and n=0.5, CPE=Warburg impedance [C. Verma, L. O. Olasunkanmi, T. W. Quadri, E.-S. M. Sherif, E. E. Ebenso, Gravimetric, Electrochemical, Surface Morphology, DFT, and Monte Carlo Simulation Studies on Three N-Substituted 2-Aminopyridine Derivatives as Corrosion Inhibitors of Mild Steel in Acidic Medium, The Journal of Physical Chemistry C, 122 (2018) 11870-11882]. Double layer capacitance, $C_{dl}$ was estimated using the equation:

$$C_{dl} = \frac{1}{2\pi f_{max} R_{ct}} \tag{11}$$

where $f_{max}$ represents the maximum frequency of the imaginary component of the impedance and $R_{ct}$ the charge-transfer resistance.

In the absence of the inhibitor, mild steel corroded freely in acidic medium without a resistive barrier giving rise to large double layer capacitance, $C_{dl}$ and lower charge transfer resistance, $R_{ct}$ (Table 3) and this was even more pronounced at higher temperature. However, when inhibitor was introduced, there was a significant drop in the values of the $C_{dl}$ and a corresponding increase in $R_{ct}$. This is because in the presence of the inhibitor molecules, charge transfer processes leading to the corrosion of the metal was prevented by adsorbed films of the inhibitor molecules thereby slowing down the corrosion rate. An overall inhibition efficiency of 98.9% was achieved at 40° C. and 100 ppm inhibitor molecule as shown in Table 3.

TABLE 3

| | | | | | | | |
|---|---|---|---|---|---|---|---|
| EIS data of mild steel corrosion in 1.0M HCl with inhibitor molecules ||||||||
| Temperature (K) | Medium | Inhibitor conc. (ppm) | Rs ($\Omega \cdot cm^2$) | Rct ($\Omega \cdot cm^2$) | Cdl ($\mu F \cdot cm^{-2}$) | n | η % |
| 298 | Blank | 0 | 1.237 | 29.54 | 431.0 | 0.91 | — |
| | PU | 20 | 2.165 | 160.2 | 31.5 | 0.84 | 81.6 |
| | | 50 | 2.120 | 313.4 | 25.7 | 0.82 | 90.6 |
| | | 100 | 2.104 | 402.3 | 25.1 | 0.82 | 93.0 |
| 313 | Blank | 0 | 1.00 | 15.56 | 1296.3 | 0.88 | — |
| | PU | 20 | 5.83 | 722.4 | 14.0 | 0.85 | 97.9 |
| | | 50 | 9.86 | 1163.0 | 13.7 | 0.85 | 98.7 |
| | | 100 | 10.76 | 1430.0 | 11.1 | 0.82 | 98.9 |

Example 11

Thermodynamic and Adsorption Studies

Activation energy of adsorption (Ea) of mild steel corrosion in 1.0 M HCl was calculated from a plot of log CR vs 1/T according to the Arrhenius equation represented as follows:

$$\log CR = -\frac{E_a}{2.303 RT} + \log A \tag{12}$$

where R=ideal gas constant, A=Arrhenius pre-exponential factor, and T=absolute temperature. Other thermodynamic parameters including standard enthalpy (ΔH°) and standard entropy (ΔS°) were further calculated by plotting log CR/T vs 1/T according to the equation:

$$\log\frac{CR}{T} = \frac{\Delta H^\circ}{2.303RT} + \left[\log\frac{R}{Nh} + \frac{\Delta S^\circ}{2.303R}\right] \quad (13)$$

where h=Planck's constant and N=Avogadro number.

Calculated values of $E_a$, $\Delta S^\circ$ and $\Delta H^\circ$ of mild steel corrosion in 1.0 M HCl in the absence and presence of inhibitor molecules are presented in Table 4. From thermodynamic point of view, activation energy plays an important role in understanding the mechanism of action of corrosion inhibitors. Lower Ea values implies higher tendency of the studied system to undergo corrosion. Activation energy increases upon addition of the inhibitor molecules compared to the un-inhibited solution which indicates an increase in surface coverage and a consequent decrease in corrosion rate. A corresponding increase in enthalpy was also observed with increasing inhibitor concentration which suggest that the observed decrease in corrosion rate of mild steel in the presence of the inhibitor molecules is mainly controlled by kinetic parameters [A. Hamdy, N. S. El-Gendy, Thermodynamic, adsorption and electrochemical studies for corrosion inhibition of carbon steel by henna extract in acid medium, Egyptian Journal of Petroleum, 22 (2013) 17-25]. A gradual increase in entropy upon addition of the inhibitor molecules indicates a decrease in disorderliness and a consequent decrease in corrosion rate.

TABLE 4

Thermodynamic activation parameters for mild steel corrosion in 1.0M HCl in the absence and presence of inhibitor molecules

| Thermodynamic parameters | Medium | | | |
|---|---|---|---|---|
| | Blank | 20 ppm | 50 ppm | 100 ppm |
| $E_{ads}$ (KJ/mol) | 13.96 | 21.51 | 25.41 | 29.59 |
| $\Delta H^*_{ads}$ (KJ/mol) | 11.65 | 18.98 | 24.13 | 29.02 |
| $\Delta S^*_{ads}$ (J/mol · K) | −110.15 | −82.63 | −67.25 | −50.61 |

An important feature of organic corrosion inhibitors is their ability to adsorb on metallic surfaces forming a protective film. Adsorption is a surface phenomenon and a consequence of surface energy. Solids are usually in a state of strain which leads to unbalanced residual forces on their surfaces. These forces cause solids to have high surface energies and hence they have the tendency to attract and retain molecular species with which they come in contact, a phenomenon known as adsorption. Adsorption could be through electrostatic attractions between charged molecules and the metal ions or through electron transfer and/or sharing between the molecules and the metal ions. The former is known as physisorption while the latter is known as chemisorption. Results from the present study were fitted into three adsorption models; Langmuir, Frumkin and Temkin and were found to fit the Langmuir adsorption model with Gibb's free energy of adsorption of the inhibitor calculated according to the equation:

$$\Delta G_{ads} = -RT \ln(55.5 K_{ads}) \quad (14)$$

where R is the molar gas constant, T the absolute temperature and 55.5 the molar concentration of water [D. Daoud, T. Douadi, H. Hamani, S. Chafaa, M. Al-Noaimi, Corrosion inhibition of mild steel by two new S-heterocyclic compounds in 1 M HCl: Experimental and computational study, Corrosion Science, 94 (2015) 21-37]. The results suggest electron sharing between the inhibitor molecules and iron on the surface of mild steel to form a strong coordinate type of bond (chemisorption) [I. B. Obot, N. O. Obi-Egbedi, Theoretical study of benzimidazole and its derivatives and their potential activity as corrosion inhibitors, Corrosion Science, 52 (2010) 657-660, incorporated herein by reference in its entirety].

To further study the adsorption of the inhibitor molecules, mild steel specimen was immersed in a solution containing 100 ppm PU at 25° C. for 24 h, followed by rinsing with anhydrous ethanol and drying in a stream of nitrogen. Contact angle measurement was carried out on bare specimen and specimen immersed in PU. The results confirms the adsorption of PU onto mild steel as the wettability was found to change from a contact angle of 75° (bare steel) to 60° (steel_PU). Thereafter the thin adsorbed film formed on the steel specimen was scratched off and analyzed by FT-IR. The results shown in FIG. 9 reveal the presence of the polymer on mild steel specimen as all peaks assigned to the various functional groups in PU (FIG. 4A) were clearly visible. In addition, absorption band due to −NH wag at 700 cm$^{-1}$ appeared broadened and increased in intensity due to bonding to Fe ions present in mild steel [S. A. Rounaghi, D. E. P. Vanpoucke, H. Eshghi, S. Scudino, E. Esmaeili, S. Oswald, J. Eckert, Mechanochemical synthesis of nanostructured metal nitrides, carbonitrides and carbon nitride: a combined theoretical and experimental study, Physical Chemistry Chemical Physics, 19 (2017) 12414-12424, incorporated herein by reference in its entirety], which is in agreement with the proposed chemisorption mechanism of adsorption of the polymer on mild steel.

Example 12

Spectroscopic Studies

Figure 10A:
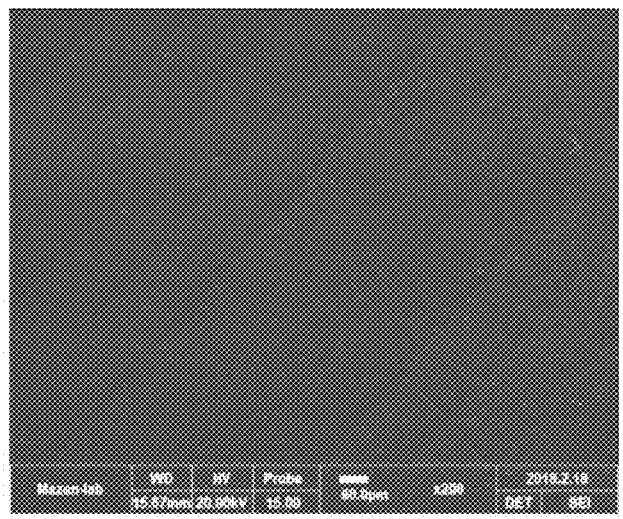
FIG. 10A is a scanning electron microscopy (SEM) micrograph showing a mild steel surface before immersing in 1.0 M HCl aqueous solution.
Figure 10B:
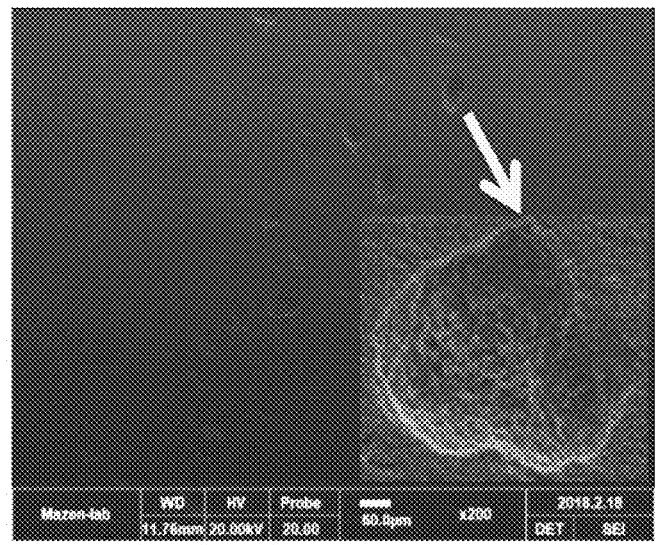
FIG. 10B is a SEM micrograph showing a mild steel surface after immersing in 1.0 M HCl aqueous solution in the absence of polyurea at 25° C. for 24 hours.
Figure 10C:
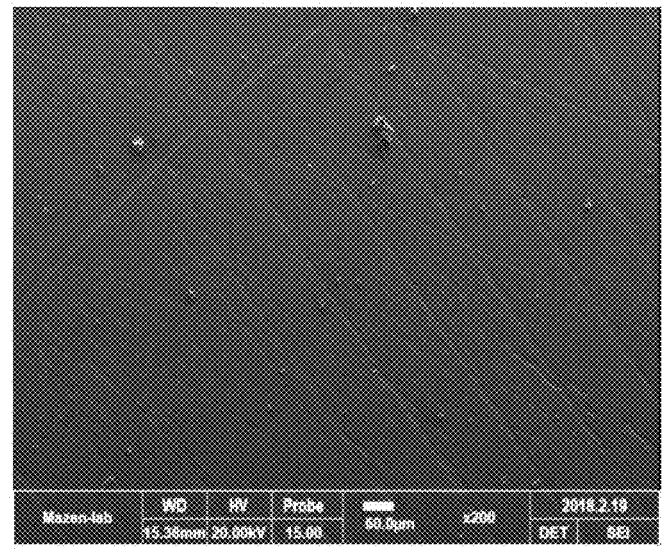
FIG. 10C is a SEM micrograph showing a mild steel surface after immersing in 1.0 M HCl aqueous solution in the presence of polyurea at 25° C. for 24 hours.
Figure 11A:
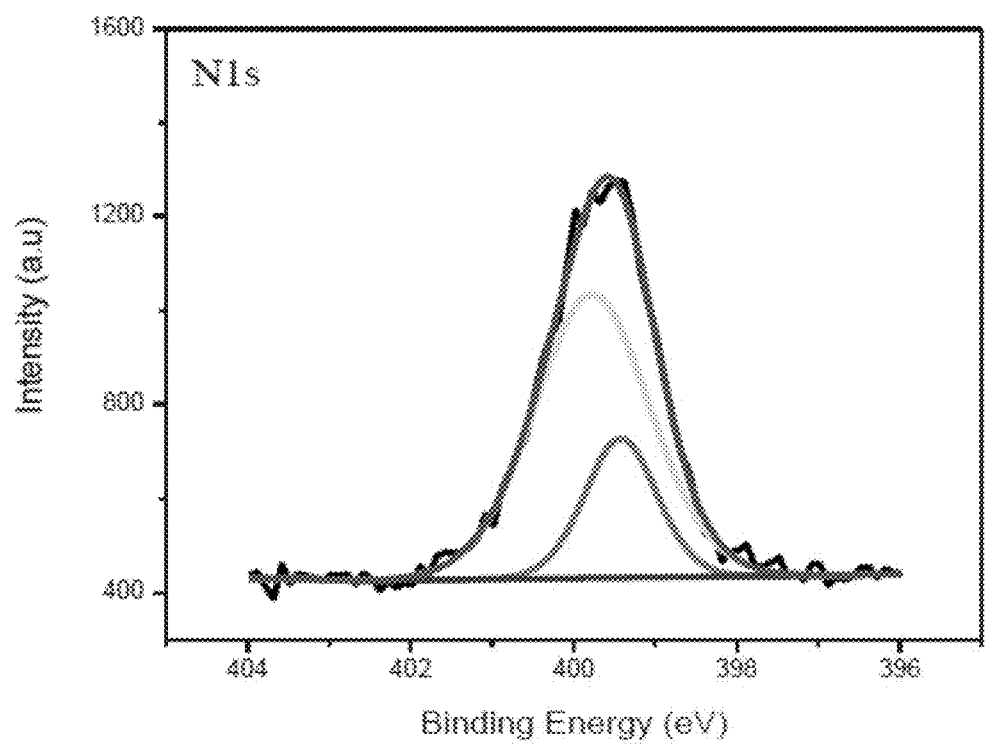
FIG. 11A shows high resolution N1s X-ray photoelectron spectroscopy (XPS) spectra of mild steel after immersing in 1.0 M HCl aqueous solution in the presence of polyurea.
Figure 11B:
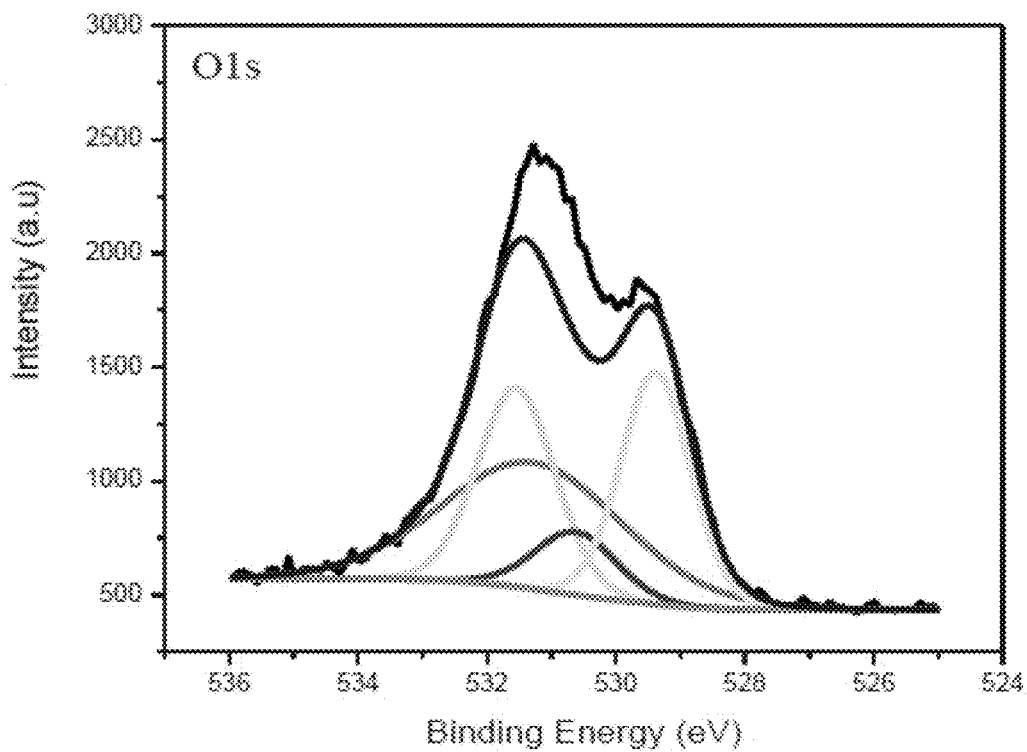
FIG. 11B shows high resolution O1s XPS spectra of mild steel after immersing in 1.0 M HCl aqueous solution in the presence of polyurea.
Figure 11C:
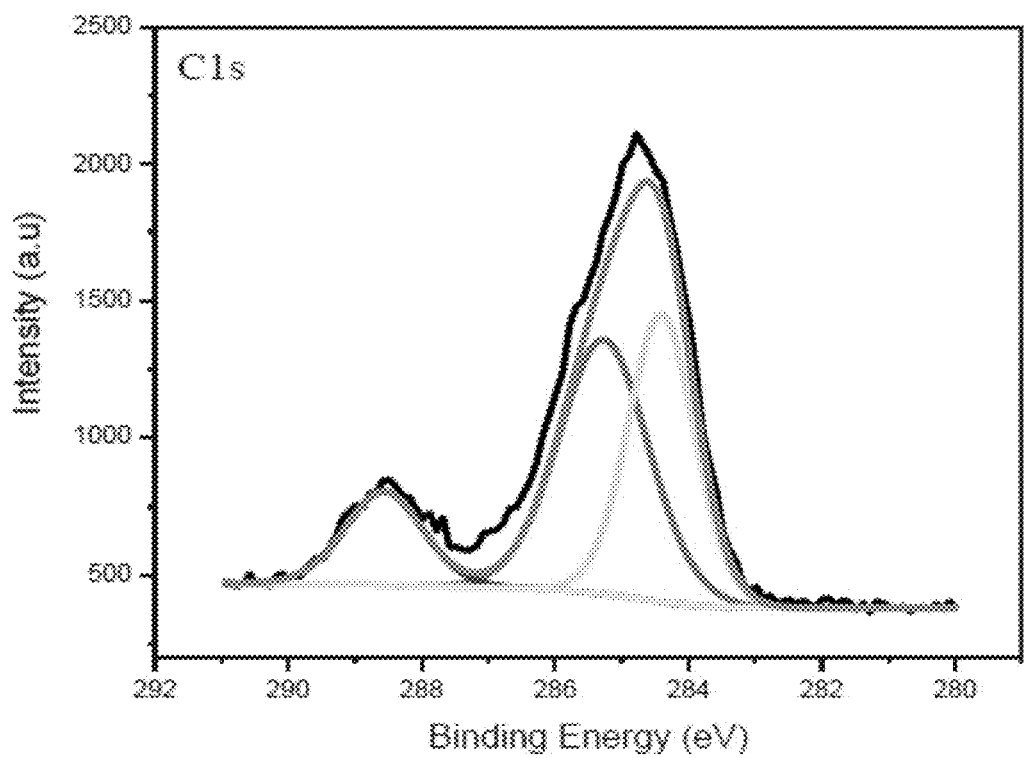
FIG. 11C shows high resolution C1s XPS spectra of mild steel after immersing in 1.0 M HCl aqueous solution in the presence of polyurea.
Figure 11D:
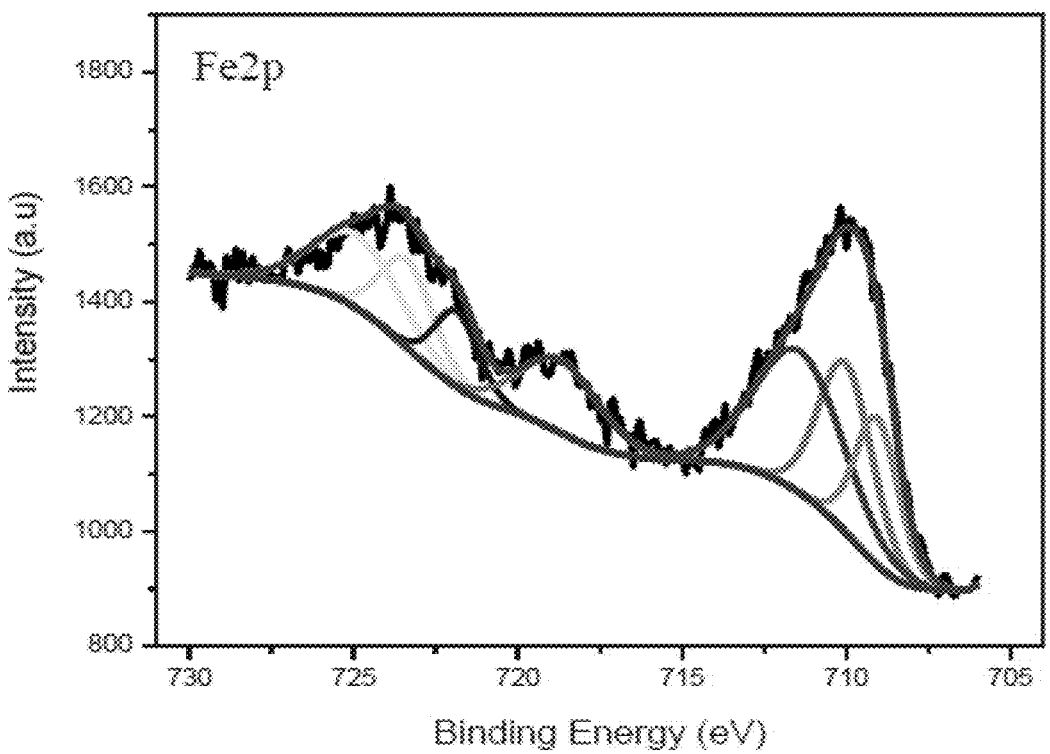
FIG. 11D shows high resolution Fe2p XPS spectra of mild steel after immersing in 1.0 M HCl aqueous solution in the presence of polyurea.

Mild steel specimens were immersed in 1.0 M HCl in the absence and presence of 100 ppm PU at 25° C. for 24 h. Thereafter the specimens were rinsed with anhydrous ethanol and dried in a stream of nitrogen and SEM micrographs were taken as shown in FIGS. 10A-C. Morphology of the specimens before immersion shows no corrosion except polishing lines that were clearly visible. Specimens immersed in 1.0 M HCl without inhibitor molecules shows evidence of pitting corrosion due to acid attack as shown in the Figure. However, these pits were absent on the specimens immersed in a solution containing 1.0 M HCl and inhibitor molecules indicating the formation of protective inhibitor films on mild steel surface which isolates the metal from the corrosive solution.

XPS analysis was further carried out to investigate the adsorption of PU on mild steel specimens and the composition of the films formed. The high resolution XPS spectra of nitrogen (N1s), oxygen (O1s), carbon (C1s) and iron (Fe2p) are presented in FIGS. 11A-D. N1s (FIG. 11A) spectrum after deconvolution was fitted into two distinct peaks at 399.2 eV and 400.0 eV. The peak at 399.2 eV was assigned to pyrrolic nitrogen atoms which serve as the basic point of interaction between PU and Fe on mild steel surface (Fe—N) [Y. Tang, F. Zhang, S. Hu, Z. Cao, Z. Wu, W. Jing, Novel benzimidazole derivatives as corrosion inhibitors of mild steel in the acidic media. Part I: Gravimetric, electrochemical, SEM and XPS studies, Corrosion Science, 74 (2013) 271-282, incorporated herein by reference in its entirety]. The second peak at 400.0 eV represents quaternary nitrogen atoms which forms as a result of protonation of the polymer in an acidic medium [T. Jafari, E. Moharreri, P. Toloueinia, A. S. Amin, S. Sahoo, N. Khakpash, I. Noshadi, S. P. Alpay, S. L. Suib, Microwave-assisted synthesis of amine functionalized mesoporous polydivinylbenzene for CO$_2$ adsorption, Journal of CO$_2$ Utilization, 19 (2017) 79-90, incorporated herein by reference in its entirety]. O1s (FIG. 11B) spectrum was fitted into four distinct peaks at 529.0 eV, 530.5 eV, 531.5 eV and 532.0 eV. The peak observed at 529.0 eV was assigned to oxygen bonded to iron (II) in the form of FeO, while the peak at 530.5 eV represent characteristic peak of α-Fe$_2$O$_3$ [D. K. Bandgar, S. T. Navale, M. Naushad, R. S. Mane, F. J. Stadler, V. B. Patil, Ultrasensitive polyaniline-iron oxide nanocomposite room temperature flexible ammonia sensor, RSC Advances, 5 (2015) 68964-68971, incorporated herein by reference in its entirety]. Others are peaks at 531.5 eV and 532.0 eV representing surface oxygen as a result of water chemisorption to form Fe(OH)$_2$, and oxygen atoms present in carbonyl functionality (C=O) of the polymer, respectively [D. K. Bandgar, S. T. Navale, M. Naushad, R. S. Mane, F. J. Stadler, V. B. Patil, Ultra-sensitive polyaniline-iron oxide nanocomposite room temperature flexible ammonia sensor, RSC Advances, 5 (2015) 68964-68971, incorporated herein by reference in its entirety]. C1s (FIG. 11C) spectrum was fitted into three peaks at 284.5 eV, 285.5 eV and 288.5 eV and were assigned to sp$^2$-hybridized carbon atoms of the phenyl ring, sp$^3$-hybridized carbon atoms and carbonyl atoms present in the polymer, respectively [G. P. Cicileo, B. M. Rosales, F. e. Varela, J. R. Vilche, Comparative study of organic inhibitors of coppercorrosion, Corrosion Science, 41 (1999) 1359-1375, incorporated herein by reference in its entirety]. Finally, Fe2p (FIG. 11D) spectrum consist of three peaks at 711.0 eV (Fe2p$_{3/2}$), 725.0 eV (Fe2p$_{1/2}$) and a satellite peak at 719.0 eV representing α-Fe$_2$O$_3$ [M.-H. Pham, C.-T. Dinh, G.-T. Vuong, N.-D. Ta, T.-O. Do, Visible light induced hydrogen generation using a hollow photocatalyst with two cocatalysts separated on two surface sides, Physical Chemistry Chemical Physics, 16 (2014) 5937-5941, incorporated herein by reference in its entirety]. The fitted Fe2p spectrum reveal the presence of Fe in the form of ferric, Fe$^{3+}$ (712.5 eV) and ferrous, Fe$^{2+}$ (709.0 eV and 710.0 eV) species almost at the same proportion. The presence of ferric species is due to the oxidation of ferrous species of iron during the course of corrosion of the steel specimen, and the overall XPS results are in agreement with experimental data which confirms the adsorption of PU molecules on the surface of mild steel.

Results of the present disclosure were compared to other recently reported polymeric corrosion inhibitors as shown in Table 5. A relatively higher inhibitive performance was achieved at a low concentration of 100 ppm, making PU a potential corrosion inhibitor of mild steel in industries where acid solutions are used for scale removal, acid pickling of metals and oil well acidification.

TABLE 5

Comparison of experimental data with reported results from literature

| Polymer | Test medium | Inhibitor Conc. (ppm) | % Inhibition | Ref. |
| --- | --- | --- | --- | --- |
| Polyurethane | 0.5M H$_2$SO$_4$ | 1600 | 99.2 | S. Kumar et al. Scientific Reports 6 (2016) 30937 [29] |
| Polyurethane | 0.5M H$_2$SO$_4$ | 20 | 97.0 | S. Banerjee et al. RSC Advances 1(2) (2011) 199-210 |
| Polyether | Sea water | 150 | 92.0 | G. Liu et al. Desalination 419 (2017) 133-140 |
| Polyaspartic acid | Sea water | 125 | 90.2 | M. A. Migahed et al. J. Molecular Liquids 224 (2016) 849-858 |
| PVPMA* | 1M HCl | 2000 | 83.0 | R. Karthi et al. Arabian Journal of Chemistry 10 (2017) S627-S635 |
| Polyurea | 1M HCl | 100 | 99.9 | Present disclosure |

Example 13

A water soluble polyurea composition was synthesized and utilized as an inhibitor for mild steel corrosion in acidic medium. Corrosion inhibition studies were carried out using electrochemical techniques and surface characterization. Structural features of the synthesized polyurea derived from DFT calculations were also studied, which correlate with experimental findings. Electronic and structural calculations showed that the polymer having high electron density centered on the nitrogen, oxygen and pi-system possess the tendency to form a strong interaction with iron forming a stable protective film which prevents the diffusion of oxygen and water molecules to the surface. Potentiodynamic and electrochemical impedance studies revealed that PU adsorb onto mild steel through chemisorption interaction and were correlated with spectroscopic studies. Overall, an inhibitive efficiency of 100% was achieved at 100 ppm with corrosion current of less than 1 µA, making PU a suitable molecule for the inhibition of mild steel corrosion in industries where acid solutions are used for scale removal, acid pickling of metals and oil well acidification.

The invention claimed is:

1. A corrosion inhibition method for a metallic substrate, comprising:
    immersing the metallic substrate in an aqueous corrosive medium which comprises at least one acid selected from the group consisting of hydrochloric acid, sulfuric acid, nitric acid, hydrofluoric acid, and phosphoric acid,
    introducing a formulation comprising a polyurea pre-dissolved in a polar aprotic solvent into the aqueous corrosive medium in contact with the metallic substrate,
    wherein:
    the formulation is devoid of epoxy ester resin;
    the polyurea comprises reacted units of a diaminoalkane and a diisocyanate; and
    the polar aprotic solvent is at least one selected from the group consisting of N-methyl-2-pyrrolidone, dimethylformamide, dimethyl sulfoxide, and 1,3-dimethyl-2-imidazolidinone.

2. The method of claim 1, wherein the diaminoalkane is at least one selected from the group consisting of ethylenediamine, 1,2-diaminopropane, 1,4-diaminobutane, and 1,6-diaminohexane.

3. The method of claim 1, wherein the diaminoalkane is 1,4-diaminobutane.

4. The method of claim 1, wherein the diisocyanate is toluene 2,4-diisocyanate, toluene-2,6-diisocyanate, or both.

5. The method of claim 1, wherein the polar aprotic solvent is N-methyl-2-pyrrolidone.

6. The method of claim 1, wherein a volume ratio of the polar aprotic solvent to the aqueous corrosive medium is in a range of 1:80 to 1:1,000.

7. The method of claim 1, wherein the polyurea is introduced into the aqueous corrosive medium at a concentration of 5-500 ppm. steel.

8. The method of claim 1, wherein the metallic substrate comprises steel.

9. The method of claim 1, wherein the metallic substrate comprises carbon steel.

10. The method of claim 1, wherein the aqueous corrosive medium comprises hydrochloric acid.

11. The method of claim 1, wherein the aqueous corrosive medium has a pH of 5 or below.

12. The method of claim 1, wherein the formulation is soluble in water.

* * * * *